US012748813B2

(12) United States Patent
Hwang et al.

(10) Patent No.: US 12,748,813 B2
(45) Date of Patent: Sep. 29, 2026

(54) TECHNIQUES FOR PROBABILISTIC IDENTIFICATION FOR CONTENT DELIVERY

(71) Applicant: Microsoft Technology Licensing, LLC, Redmond, WA (US)

(72) Inventors: Albert Hwang, Prosper, TX (US); Xiaowen Zhang, San Francisco, CA (US); Mingyang Hu, San Francisco, CA (US); Sudhanshu Arora, Fremont, CA (US); Lingqian Wei, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/073,420

(22) Filed: Mar. 7, 2025

(65) Prior Publication Data

US 2026/0267931 A1 Sep. 10, 2026

(51) Int. Cl.
*G06F 16/90* (2019.01)
*G06F 16/9035* (2019.01)
*G06F 16/9535* (2019.01)

(52) U.S. Cl.
CPC ...... *G06F 16/9535* (2019.01); *G06F 16/9035* (2019.01)

(58) Field of Classification Search
CPC ......................... G06F 16/9535; G06F 16/9035
See application file for complete search history.

(56) References Cited

U.S. PATENT DOCUMENTS 9,053,185 B1 * 6/2015 Liu ....................... G06F 16/951
10,922,390 B1 * 2/2021 Zhou ..................... G06F 21/316
10,949,434 B1 * 3/2021 Tirupattur Saravanan .................. G06F 16/2465
12,099,632 B2 9/2024 Rogers
2013/0325583 A1 * 12/2013 Arini .................. G06Q 30/0242 705/14.41
2014/0237570 A1 * 8/2014 Shishkov .............. G06F 21/316 726/7
2018/0197107 A1 * 7/2018 Belous ................... G06N 5/022
2018/0349800 A1 * 12/2018 Saba ........................ G06N 5/04
2022/0247645 A1 * 8/2022 Das ..................... G06F 11/3672
2023/0186342 A1 * 6/2023 Ding .................. G06Q 30/0243 705/14.42

OTHER PUBLICATIONS

Article entitled "Webform Optimization using Machine Learning", by Hanmandla et al., dated Apr. 4, 2021 (Year: 2021).*

(Continued)

*Primary Examiner* — Mahesh H Dwivedi
(74) *Attorney, Agent, or Firm* — KDW Firm PLLC

(57) ABSTRACT

Machine learning (ML) and probabilistic techniques for identification and content delivery are described. A method comprises receiving, by a content delivery server, a request from a web server for content. The server then determines a set of user-probability pairs, each pair including a predicted user identifier and a probability that the predicted user identifier is associated with the request from the web server. The method further includes applying an objective function to the set of user-probability pairs to select one of the user identifiers with a corresponding candidate user profile. Based on the selected user identifier, a content item is selected for delivery to the web server.

16 Claims, 16 Drawing Sheets

(56) References Cited

OTHER PUBLICATIONS

"Hyperbolic Functions", Retrieved from: https://en.wikipedia.org/wiki/Hyperbolic_functions, Retrieved on: Jul. 15, 2025, 12 Pages.
"Sigmoid Function", Retrieved from: https://en.wikipedia.org/wiki/Sigmoid_function, Retrieved on: Jul. 15, 2025, 06 Pages.
"Soboleva Modified Hyperbolic Tangent", Retrieved from: https://en.wikipedia.org/wiki/Soboleva_modified_hyperbolic_tangent, Retrieved on: Jul. 15, 2025, 04 Pages.

* cited by examiner

TECHNIQUES FOR PROBABILISTIC IDENTIFICATION FOR CONTENT DELIVERY

BACKGROUND

Content delivery has become ubiquitous in today's interconnected world. Content may be in the form of digital images, text, graphics, videos, advertisements, and the like. Content delivery may include sending content for display on web browsers, web applications, mobile devices, mobile applications, etc. In some cases, a content delivery service or system might not have insight about the entity to which content should be delivered, for example a user browsing a website. Knowing who the user is (or might be) can provide value to the content delivery service because the type and subject matter of the content can be tailored to the user based on known attributes or qualities of the user. However, in many cases an identity of the user may not be easy to determine and doing so may take away valuable time and processing power.

There is therefore a need to provide an improved system that provides a technical solution to these technological problems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
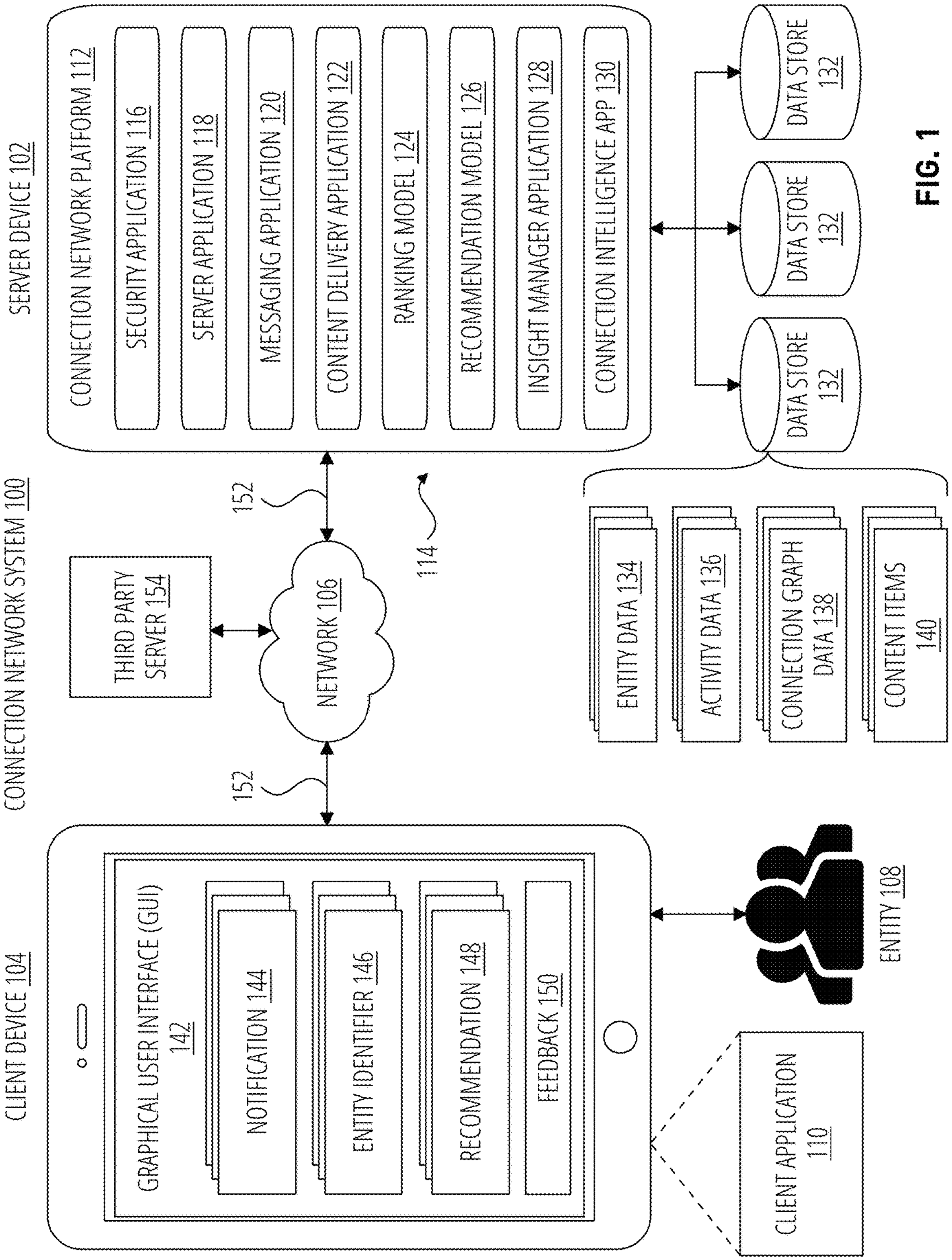
FIG. 1 illustrates a connection network system in accordance with one embodiment.

Embodiments are generally directed to probabilistic identification for content delivery. Some embodiments are particularly directed to leveraging probabilistic approaches to infer an entity's identity for delivering content to the entity. An example scenario in which the present application may be utilized involves an entity (e.g., a user) accessing a web resource (e.g., website) of a third party. The subject matter described herein can be applied to a single user or entity, a group of users or entities, a corporate or business entity, a group of members, or, for example, an anonymized group of members or entities. As such, any reference in this description to a "user" or "entity" can also refer to a group of users or entities. The third party can be a web hosting service or some other organization that hosts a website and wishes to delivery content to the entity. The third party has engaged with another entity, namely a connection network system to provide content delivery to the entity. However, in the process, the third party does not provide the connection network system with a deterministic way to identify the entity. That is, the connection network does not have sufficient information about the entity to definitively determine the identity of the entity.

Even though the connection network system doesn't know the identity of the entity, the connection network system is configured to provide content delivery that is as relevant as possible to the entity or at least will provide value to the third party by delivering content to the entity that will at least interest the entity to remain on the third party web service.

Overview

A connection network system may provide access to a large amount of electronic content aimed at professional networking and career development. For example, a connection network system may list employment opportunities posted by employers across different industries, professional profiles with detailed information about users of the connection network system (e.g., work experience, skills, and endorsements), articles or posts created by users and industry leaders covering various topics (e.g., business, technology, and career advice), online courses and tutorials on a wide range of professional skills and subjects, company profiles offering insights about a company (e.g., company culture, job openings, and industry news), connections and networking tools to connect with and recommend other professionals, forums and discussion groups where users can share ideas and discuss industry trends, and other types of content designed to facilitate professional growth and industry engagement.

Various types of entities may access the web service of the third party and receive content delivery from the connection network system. Non-limiting examples of entities include an individual, a person, a user, a member, a subscriber, a corporate entity, a company, a business, an organization, a governmental agency, a community, a group of users or entities, an anonymized group of users or members, and the like.

In some cases, the connection network system collects a variety of data associated with the various types of entities of the platform in accordance with privacy policies which govern how this information is collected, used, and shared. However, as discussed above, in the context of the present application, the connection network system does not know the identity of the entity for which the third party is seeking content delivery.

The proposed solution herein is a technical solution to the technical problem of delivering relevant content to an entity whose identity is unknown. For one, the third party may not know the identity of the entity either. In other examples, the third party does not send identification information about the entity to the connection network system for privacy reasons or because the third party is unable to determine identification information about the entity. The present application solves the technical problem of identifying the entity and delivering content thereto without being able to communicate with the entity (e.g., requesting the identity of the entity directly), and without receiving identification information from the third party.

Conventional approaches to content delivery involve determining an identity of the entity for content delivery. This may be done by the connection network system inspecting device identifiers (e.g., hardware device identifiers, serial numbers, etc.) of the entity device from the third party service. The device identifier received from the third party service could then be checked to see if a device that has connected to the connection network system has used that device identifier and connect the device identifier to a user account with the connection network system. The identity of the entity would then be known to the connection network system. However, this requires 1) that the third party send the device identifier of the entity accessing the third party web source and 2) that the device identifier be associated with a device that has an account with or uses the connection network system. Therefore, there is a substantial need for automated systems to overcome these technical challenges by providing a system that can deliver relevant content to the entity without knowing the identity of the entity.

To overcome these and other challenges, various embodiments described herein implement statistical models as well as artificial intelligence (AI) and machine learning (ML) techniques to support various operations of the connection network system. The statistical models and AI and ML techniques are used to provide a list of candidate users having user accounts with the connected network service and a probability that a given candidate user is the entity accessing the third party service. The system described herein then selects one of the candidate users and delivers content to the entity based on profile attributes of the candidate user that the candidate user has with the connection network service. For example, if the selected candidate user has an account or profile attribute indicating that they have an interest in a subject, content related to the subject is delivered to the third party service to thereby forward to the entity (e.g., via a web browser, connected television device, or mobile application).

The embodiments disclosed herein provide several technical solutions to technical problems faced by conventional systems. For example, embodiments provide automation that enables a connection network system to determine a likely identity of an entity and deliver content that is relevant to the entity. The connection network system is able to determine the likely identity of the entity even though the connection network does not receive any deterministic data regarding the identity of the entity. In addition, embodiments introduce a level of personalization with recommendations and insights customized for a given entity or contact preference. Embodiments provide other technical solutions to other technical problems as well.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED EMBODIMENTS

FIG. 1 illustrates a connection network system 100. The connection network system 100 is an example of an architecture or framework for an online computer and communications system designed to serve content items to an electronic device associated with a user. Embodiments are not limited to this example.

In general, the connection network system 100 may include a variety of servers, sub-systems, programs, modules, logs, and data stores. In particular embodiments, the connection network system 100 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The connection network system 100 may also include suitable components such as network interfaces, security mechanisms, load balancers, failover servers, management-and-network-operations consoles, privacy software, and other suitable components, or any suitable combination thereof.

As depicted in FIG. 1, the connection network system 100 comprises a server device 102 communicating with a client device 104 over a network 106. In operation, an entity 108 (e.g., a user, a user account, a robot, an automated system, an artificial intelligence (AI) device, etc.) interacts with a client application 110 of the client device 104 to access applications and services provided by a connection network platform 112 of the server device 102. The connection network platform 112 offers a number of network services 114 for the connection network system 100, such as network services provided by a security application 116, a server application 118, a messaging application 120, a content delivery application 122, a ranking model 124, and/or a recommendation model 126. The server device 102 has access to one or more data stores 132. The data stores 132 store information for the connection network platform 112, such as entity data 134, activity data 136, connection graph data 138, and content items 140.

The connection network system 100 comprises a server device 102. In particular embodiments, a server device 102 may be an electronic device including hardware, software, or embedded logic components or a combination of two or more such components and capable of carrying out the appropriate functionalities implemented or supported by a server device 102. The server device 102 may comprise a unitary server or a distributed server spanning multiple computers or multiple data centers. The server device 102 may comprise one or more physical servers or virtual servers hosting one or more networking applications. As an example and not by way of limitation, a server device 102 may comprise part of a larger server system comprising multiple server devices organized as a data center, an edge computing center, or a cloud-computing center. This disclosure contemplates any suitable server device 102. A server device 102 may be accessed by entity 108 (e.g., user, group of users, group of entities, or the like, as described above) at a client device 104 via the network 106. A client device 104 may enable the entity 108 to communicate with other entities 108 at the server device 102, such as via messaging applications 120. In instances where a group of entities 108 are accessing the third party server 154, a set of client devices 104 may be included, each with their own GUI 142, client application 110, and other components of the client device 104 shown in FIG. 1

In one embodiment, for example, the server device 102 may be implemented as a web server. The web server may be used for linking the connection network platform 112 to one or more of the client devices 104 via a network 106. The web server may include a mail server or other messaging functionality for receiving and routing messages between the connection network platform 112 and one or more client devices 104. An API-request server may allow a gaming platform, a third-party system, a messaging system, and/or an AI system to access information from the connection network platform 112 by calling one or more APIs. An action logger may be used to receive communications from a web server about a user's actions on or off the connection network platform 112. In conjunction with the action log, a third-party-content-object log may be maintained of user exposures to third-party-content objects. A notification controller may provide information regarding content objects to a client device 104. Information may be pushed to a client device 104 as notifications, or information may be pulled from a client device 104 responsive to a request received from a client device 104. Authorization servers may be used to enforce one or more privacy settings of the users of the connections networking system. A privacy setting of a user determines how particular information associated with a user can be shared. The authorization server may allow users to opt in to or opt out of having their actions logged by the connection network platform 112 or shared with other systems (e.g., a third-party system), such as, for example, by setting appropriate privacy settings. Third-party-content-object stores may be used to store content objects received from third parties, such as a third-party system. Location stores may be used for storing location information received from client device 104 associated with users. Advertisement-pricing modules may combine connections information, the current time, location information, or other suitable information to provide relevant advertisements, in the form of notifications, to a user.

The connection network system 100 comprises a connection network platform 112. In particular embodiments, the connection network platform 112 may be part of a network-addressable computing system that can host an online connection network. The connection network platform 112 may generate, store, receive, and send connection networking data, such as, for example, entity data 134 (e.g., user-profile data, concept-profile data, etc.), activity data 136 (e.g., user interactions with connection network platform 112), connection graph data 138 (e.g., connections between users or entities), content items 140, or other suitable data related to the online connection network. The connection network platform 112 may be accessed by the other components of the connection network system 100 either directly or via a network 106. As an example and not by way of limitation, a client device 104 may access the connection network platform 112 using the client application 110, which may be a web browser or a native application associated with the connection network platform 112 (e.g., a mobile connection network application, another suitable application, or any combination thereof) either directly or via a network 106.

The connection network platform 112 may offer, provide or implement a number of network services 114 via one or more applications (e.g., SaaS model), such as a security application 116, server application 118, messaging application 120, content delivery application 122, ranking model 124, recommendation model 126, insight manager application 128, and/or connection intelligence application 130. Embodiments are not limited to these examples.

The connection network platform 112 comprises a security application 116. In particular embodiments, a security application 116 may be an application or electronic device including hardware, software, or embedded logic components or a combination of two or more such components and capable of carrying out the appropriate functionalities implemented or supported by the security application 116. The security application 116 is a network security system that encompasses a suite of technologies, policies, and practices designed to protect the integrity, confidentiality, and availability of data within the connection network platform 112 from unauthorized access, attacks, and other security threats. The security application 116 comprises components such as firewalls, which act as a barrier between trusted and untrusted networks; Intrusion Detection and Prevention Systems (IDPS) that monitor for malicious activity; antivirus and anti-malware software for removing harmful software; and Virtual Private Networks (VPNs) for secure remote access. Additionally, Data Loss Prevention (DLP), email security measures, and encryption are vital for protecting sensitive information and ensuring that only authorized users can access and understand it. Effective network security also requires rigorous access control to restrict network resources to authorized users, alongside Security Information and Event Management (SIEM) systems for real-time security alert analysis. Endpoint security further safeguards devices connected to the network, which are frequent entry points for security threats. The security application 116 implements security practices to ensure a robust defense against a wide array of cyber threats, safeguarding organizational assets and maintaining trust with stakeholders.

The connection network platform 112 comprises a server application 118. In particular embodiments, the server application 118 may be a web server to serve content information, such as content items 140, to the client application 110 of the client device 104. The server device 102 may accept an HTTP request and communicate to a client device 104 one or more HTML files responsive to the HTTP request. The server device 102 may send HTML files representing a webpage with content information for presentation via an electronic display of the client device 104 to the entity 108.

In particular embodiments, the server application 118 may be an application operable to provide various computing functionalities, services, and/or resources, and to send data to and receive data from the other entities of the network 106, such as the client device 104, the connection network platform 112, a third-party server 154, and other electronic devices within the connection network system 100. For example, the server application 118 may be an e-commerce application, a content application, an advertisement application, a web interface, a messaging application, a video application, a webpage, and so forth.

In particular embodiments, the server application 118 may be an application for managing various applications and services provided by the online connection network hosted on the connection network platform 112. In particular embodiments, the server application 118 may include hardware, software, or embedded logic components or a combination of two or more such components for carrying out the appropriate functionalities implemented or supported by connection network platform 112. Although the server device 102 is shown with a single server application 118, it should be noted that this is not by any way limiting and this disclosure contemplates any number of server applications 118.

The connection network platform 112 comprises a messaging application 120. The messaging application 120 is software that enables users to send and receive messages, including text, images, videos, and other multimedia content, over a network 106, such as a local or broad network such as the internet. These applications support real-time communication, allowing immediate message exchange, and typically offer features like group messaging, notifications, and file sharing. They manage user identities, contacts, and groups, while ensuring security through authentication and encryption measures. Designed to operate over various network types, such as Wi-Fi or cellular data, messaging applications can also integrate with other network services and platforms, enhancing their functionality and user experience.

The connection network platform 112 comprises a content delivery application 122. The content delivery application 122 is a software tool that allows users to efficiently deliver content items to other users of the connection network platform 112 of the connection network system 100, such as content items 140 stored by one or more data stores 132 or third-party content servers. An example for the content delivery application 122 is a demand-side platform (DSP) used by users such as employees (e.g., an account manager) for an advertising entity. A DSP allows advertisers to purchase and manage ad inventory from multiple ad exchanges and networks through a single interface to implement marketing solutions for products or services of the advertiser. The content delivery application 122 allows advertisers to create, manage, and analyze their ad campaigns on the platform in accordance with a larger programmatic advertising strategy. It allows for precise targeting based on entity data 134 and/or activity data 136, making it especially useful for business-to-business (B2B) or business-to-consumer (B2C) marketing campaigns. The content delivery application 122 delivers content items 140, such as a series of one or more advertisements, to an audience of producing entities 108 of the connection network platform 112 of the connection network system 100. The content delivery application 122 assist advertisers in delivering content and ads to a professional audience by leveraging user profiles, job titles, industries, and other entity data 134 and activity data 136 collected by the connection network platform 112.

The connection network platform 112 comprises various machine learning (ML) models, such as a ranking model 124. A ranking model 124 in machine learning is a ML model designed to order or prioritize a set of items based on their relevance to a given query. Unlike traditional classification or regression models, ranking models output a sorted list of items, making them essential for applications like information retrieval systems, recommendation engines, and search engines. They predict the relevance of each item, employing specialized loss functions and feature engineering to optimize ranking order. Performance is evaluated using metrics such as Mean Reciprocal Rank (MRR) and Normalized Discounted Cumulative Gain (NDCG). Examples include RankNet, LambdaRank, and LambdaMART, which are used by the connection network platform 112 to surface the most relevant results or recommendations to users.

The connection network platform 112 comprises various ML models, such as a recommendation model 126. A recommendation model 126 in machine learning is an ML model designed to predict and suggest items that are likely to be of interest to users, analyzing patterns in user behavior, preferences, and interactions to generate personalized recommendations. These models are widely used in e-commerce, streaming services, and social media to enhance user experience and engagement. Techniques include collaborative filtering, which identifies similarities between users and items based on interactions and feedback, and content-based filtering, which recommends items similar to those a user has shown interest in based on item attributes. Hybrid methods combine multiple approaches to improve accuracy and diversity. Evaluation metrics for recommendation models include precision, recall, Mean Average Precision (MAP), and Normalized Discounted Cumulative Gain (NDCG). Examples include matrix factorization techniques, deep learning approaches like neural collaborative filtering, and graph-based methods, as utilized by platforms such as YouTube, Spotify, and Amazon to provide tailored content and product suggestions.

The connection network platform 112 comprises an insight manager application 128.

The insight manager application 128 may generate insights (e.g., recommendations 148) for the client application 110. Additionally, or alternatively, the insight manager application 128 may generate recommendation 148 for another network service offered by the connection network platform 112. For example, the insight manager application 128 may interoperate with the connection intelligence application 130 to generate insights for the connection intelligence application 130 of the connection network system 100. In some embodiments, both the insight manager application 128 and the connection intelligence application 130 may be integrated into a single network application offering a single network service.

The insight manager application 128 may generate insights for an entity 108 to sell products or services to a target entity. In some embodiments, the entity 108 and the target entity are both members (e.g., users or subscribers) of the connection network platform 112. As such, the connection network platform 112 stores entity data 134 and activity data 136 for both entities. The insight manager application 128 may use this data, at least in part, to generate the insights for the connection intelligence application 130. In some embodiments, the entity 108 is a business entity (e.g., a company) and the target entity is a consumer entity (e.g., a user) in a business-to-consumer (B2C) model. In some embodiments, the entity 108 is a business entity and the target entity is another business entity in a business-to-business (B2B) model. The insight manager application 128 may use, at least in part, a single or multi-layer prediction model to generate a set of candidate target entities, an optimization algorithm implementing an objective function to optimize the set of candidate target entities (e.g., filter or identify a subset) and select a target entity ready for an action from the set of candidate target entities, and a recommendation model to generate a recommendation 148 for the entity 108. The recommendation 148 may be generated in a human-readable form, such as in a natural language. Embodiments are not limited to certain network services such as insight services or connection intelligence services, and can be implemented for any network services provided by a connection network system 100, such as a talent management service, among other types of network services. Embodiments are not limited in this context.

The connection network platform 112 comprises a connection intelligence application 130. With the assistance of the insight manager application 128, the connection intelligence application 130 is generally designed to identify, generate and deliver electronic recommendations 148 to the entity 108 (e.g., customers) about a target entity based, at least in part, on entity data 134 and activity data 136 of one or more target entities of the connection network system 100. In particular, the connection intelligence application 130 may utilize one or more ML models to deliver recommendations to the entity 108 (e.g., an account representative, sales agent, marketing manager, etc.) to perform an action for a target entity (e.g., a customer, a business, a user, etc.) to further a defined objective associated with the target entity. Non-limiting examples of actions may include engagement such as an entity to contact, topics to discuss, offers to provide, and otherwise prompting an interaction between the entity 108 and the target entity, such as conducting a phone call, sending a message, delivering a content item like an advertisement, providing a promotion, and so forth. Non-limiting examples of objectives may include optimizing potential revenue from an entity, increasing customer engagement, selling a particular product or service, initiating or renewing a subscription, and so forth. The insight manager and connection intelligence are designed to interoperate in order to identify a given account for a specific action at a defined time. Utilizing machine learning, the connection intelligence can streamline and eliminate the need for manual categorization of customers and the identification of accounts experiencing declining engagement. These approaches empower account representatives to navigate the technical complexities of the sales process effectively, leading to successful client acquisitions and satisfaction.

The server device 102 comprises, or has access to, one or more data stores 132. In particular embodiments, the connections networking system 102 may include a data store 132. The data store 132 may be used to store various types of information for the server device 102 and/or the connection network platform 112. In particular embodiments, the information stored in the data store 132 may be organized according to specific data structures. In particular embodiments, the data store 132 may be a relational, columnar, correlation, or other suitable database. Although this disclosure describes or illustrates particular types of databases, this disclosure contemplates any suitable types of databases. Particular embodiments may provide interfaces that enable a client device 104 or a connection network platform 112 to manage, retrieve, modify, add, or delete, the information stored in the data store 132.

In one embodiment, for example, the data store 132 stores entity data 134 for the connection network platform 112. In particular embodiments, the connection network platform 112 may include entity data 134 for users of the connection network platform 112. For example, the entity data 134 may comprise one or more user profiles. A user profile may include, for example, biographic information, demographic information, behavioral information, social information, professional information, or other types of descriptive information, such as work experience, educational history, hobbies or preferences, interests, affinities, or location. Interest information may include interests related to one or more categories. Categories may be general or specific. The connection information may indicate users who have similar or common work experience, group memberships, hobbies, educational history, or are in any way related or share common attributes. The connection information may also include user-defined connections between different users and content (both internal and external).

In one embodiment, for example, the data store 132 stores activity data 136 for the connection network platform 112. The activity data 136 represents various activities recorded for an entity 108 by the connection network platform 112. In particular embodiments, the connection network platform 112 may provide users with the ability to take actions on various types of items or objects supported (or accessible) by connection network platform 112. As an example and not by way of limitation, the items and objects may include groups or connections networks to which users of the connection network platform 112 may belong, events or calendar entries in which a user might be interested, computer-based applications that a user may use, transactions that allow users to apply to job openings or post job openings via the service, interactions with advertisements that a user may perform, content items, online games, or other suitable items or objects. A user may interact with anything that is capable of being represented in the connection network platform 112 or by an external system of a third-party system, which is separate from the server device 102 and coupled to the server device 102 via a network 106.

In one embodiment, for example, the data store 132 stores connection graph data 138 for the connection network platform 112. The connection network platform 112 may store connection graph data 138 for one or more users (e.g., members with subscription accounts) of the connection network platform 112. In one embodiment, for example, connection graph data 138 may be connection data for users organized as a graph. The graph may include multiple nodes, which may include multiple user nodes each corresponding to a particular user or multiple entity nodes each corresponding to a particular entity, such as a business entity. The graph may also have multiple edges connecting the nodes. The connection network platform 112 may provide users of the online connection network system 100 the ability to communicate and interact with other users. In particular embodiments, users may join the online connection network platform 112 via the connection network system 100 and then add connections (e.g., relationships) to a number of other users of the connection network platform 112 to whom they want to be connected. Herein, the term "connection" may refer to any other user of the connection network platform 112 or the connection network system 100 with whom a user has formed a friendship, association, or relationship via the connection network platform 112.

In one embodiment, for example, the data store 132 stores content items 140 for the connection network platform 112. The content items 140 may comprise any type of multimedia content, such as text files, multimedia files, image files, video files, graphic files, movies, articles, user feeds, advertisements for a content delivery campaign, banners, recommendations, games, messages, emojis, program code, animations, and so forth. In particular embodiments, the connection network platform 112 also includes user-generated content (UGC) objects, which may enhance a user's interactions with the connection network platform 112. User-generated content may include anything a user can add, upload, send, message, or "post" to the connection network platform 112. As an example and not by way of limitation, a user communicates posts to the connection network platform 112 from a client device 104. Posts may include data such as status updates or other textual data, articles, job openings, company information, awards, location information, photos, videos, links, music or other similar data or media. Content may also be added to the connection network platform 112 by a third-party through a "communication channel," such as a newsfeed or content stream.

The connection network system 100 comprises a client device 104. In particular embodiments, a client device 104 may be an electronic device including hardware, software, or embedded logic components or a combination of two or more such components and capable of carrying out the appropriate functionalities implemented or supported by a client device 104. As an example and not by way of limitation, a client device 104 may include a computer system such as a desktop computer, notebook or laptop computer, netbook, a tablet computer, e-book reader, global positioning system (GPS) device, camera, personal digital assistant (PDA), handheld electronic device, cellular telephone, smartphone, wearable device, other suitable electronic device, or any suitable combination thereof. This disclosure contemplates any suitable client device 104. A client device 104 may enable a network user at a client device 104 to access a network 106. A client device 104 may enable its entity 108 to communicate with other producing entities 108 at other client devices 104, such as via messaging application 120.

The connection network system 100 comprises a client application 110. In particular embodiments, a client device 104 may include a client application 110, which may be a web browser, and may have one or more add-ons, plug-ins, or other extensions. An entity 108 at a client device 104 may enter a Uniform Resource Locator (URL) or other address directing a web browser to a particular server device 102 such as a server or server data center for a connection network platform 112, and the web browser may generate a Hyper Text Transfer Protocol (HTTP) request and communicate the HTTP request to the server device 102. The server device 102 may accept the HTTP request and communicate to a client device 104 one or more Hyper Text Markup Language (HTML) files responsive to the HTTP request. The client device 104 may render a web interface (e.g. a webpage) based on the HTML files from the server for presentation via an electronic display of the client device 104 to the entity 108. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as Asynchronous JAVASCRIPT (AJAX), and XML), and the like. Herein, reference to a web interface encompasses one or more corresponding source files (which a browser may use to render the web interface) and vice versa, where appropriate.

In particular embodiments, the client application 110 may be an application operable to provide various computing functionalities, services, and/or resources, and to send data to and receive data from the other entities of the network 106, such as the connection network platform 112. For example, the client application 110 may be a client connection network application tightly integrated with the connection network platform 112, a messaging application 120 for messaging with producing entities 108 of a messaging network or system, a web browser application, an internet searching application, and so forth. Non-limiting examples of client application 110 include a cloud-based suite of business applications, such as enterprise resource planning (ERP), customer relationship management (CRM, productivity applications, and AI tools designed to help organizations unify their data, streamline operations and workflows, improve customer engagement, and make data-driven decisions to drive digital transformation and remain competitive in a dynamic marketplace.

In particular embodiments, the client application 110 may be storable in a memory and executable by a processor circuitry of the client device 104 to render user interfaces, receive user input, send data to and receive data from the connection network platform 112. The client application 110 may generate and present user interfaces to a user via an electronic display of the client device 104. For example, the client application 110 may generate and present a GUI 142 based at least in part on information received from the server device 102, the connection network platform 112, and/or another device or system (e.g., a third party server) via the network 106. The GUI 142 may include various GUI elements for the client application 110 to drive interaction between the entity 108, the client device 104, and the server device 102. When the client application 110 is a business application, such as an ERP or CRM, the GUI 142 may comprise GUI elements for one or more notifications 144, entity identifiers 146, recommendations 148, and feedback 150.

The connection network system 100 comprises a network 106. This disclosure contemplates any suitable network 106. As an example and not by way of limitation, one or more portions of a network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A single network 106 may comprise multiple networks 106.

In operation, an entity 108 interacts with a client application 110 of the client device 104 to access applications and services provided by a connection network platform 112 of the server device 102 via one or more links 152 of the network 106. The links 152 may connect each client device 104 to the connection network platform 112 via the network 106. This disclosure contemplates any suitable link 152. In particular embodiments, one or more links 152 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 152 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 152, or a combination of two or more such links 152. Links 152 need not necessarily operate at the same throughout. One or more first links 152 may differ in one or more respects from one or more second links 152.

In some other embodiments, a third party server 154 may be connected to network 106. In some embodiments, the third party server 154 can be a web server, an application server, a cloud-based server, a personal computer, or any other suitable computing device capable of performing operations described herein. The third party server 154 can host a website or an application at which content can be received from the server device 102 (e.g., from the content delivery application 122) and then delivered (e.g., displayed) to an entity 108. In this embodiment, the entity 108 may not access the connection network platform 112 directly. Instead, the entity 108 connects to the third party server 154 using the client device 104. Entity 108 can access the third party server 154 using a web browser on the client device 104 or using an application hosted by the third party server 154. In this embodiment, the entity 108 may have an established user account with the connection network platform 112 and the entity 108 may access their user account via the client application 110.

When referring to entity 108 herein, this is an entity accessing the third party server 154 and the server device 102 does not have deterministic data indicating an identity of the entity 108. Server device 102 does have access to entity data 134 which includes user profile data regarding a plurality of user profiles of users that use the connection network platform 112. The entity 108 may have a user profile with connection network platform 112, however, server device 102 is not informed of this by the third party server 154. The user profiles of the entity data 134 are indexed by user identifiers (e.g., user profiles are referred to by the server device 102 using the user identifiers). When referring to a user profile of connection network platform 112, the term user identifier will be used.

In this example embodiment, the entity 108 accesses the website or application hosted by the third party server 154. The third party server 154 may desire to deliver content to the entity 108 via the website or application hosted by the third party server 154. The content may include any of the content items 140 described herein. For example, the content may include one or more videos, images, pictures, advertisements, text, graphics, one or more graphics interchange formats (GIFs), or any other suitable content. The third party server 154 will then communicate with the server device 102, requesting the content, and the server device 102 will perform operations described herein to determine what content to delivery to the third party server 154. Next, the content delivery application 122 will deliver content to the third party server 154 based on the determination from the server device 102.

Figure 2:
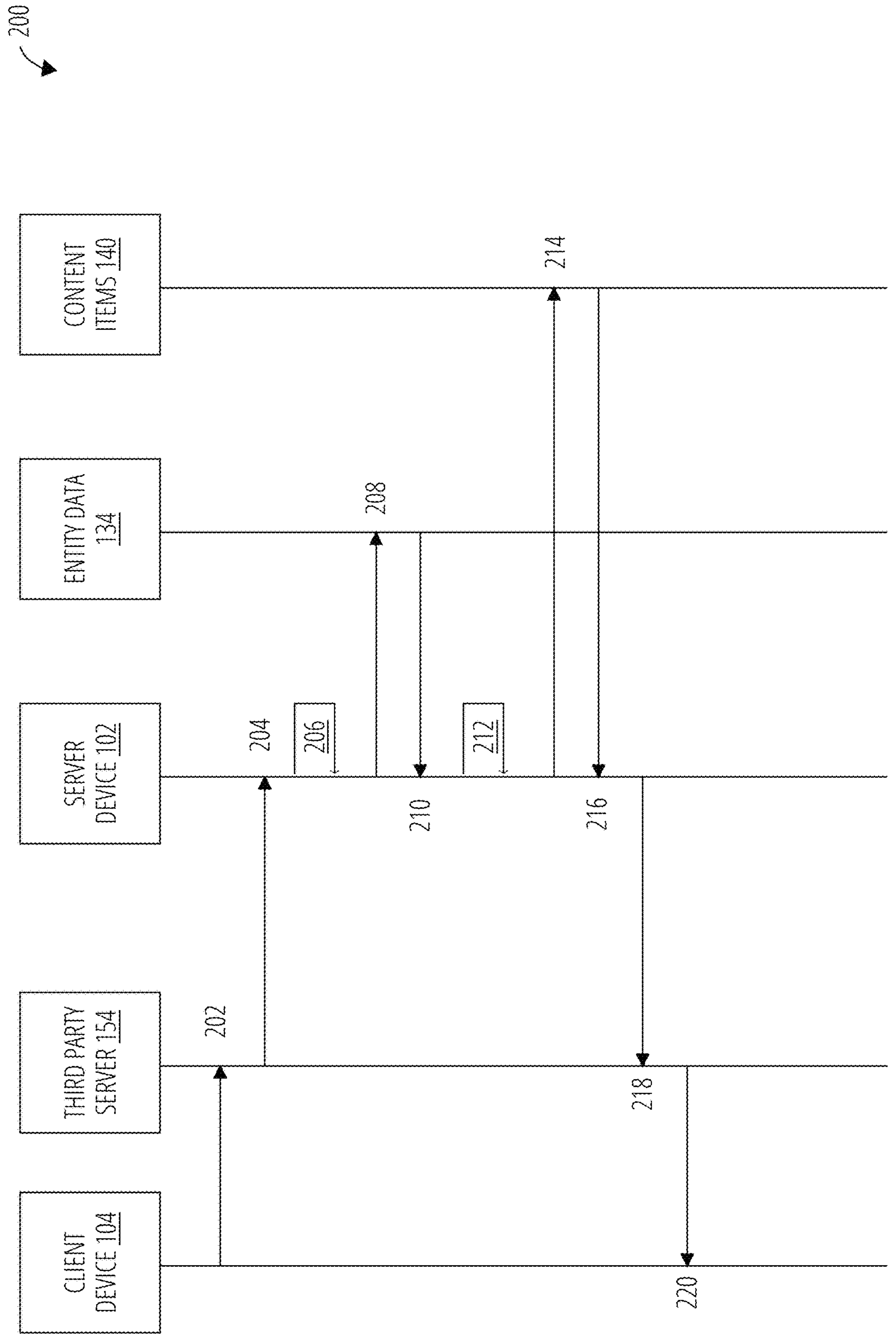
FIG. 2 illustrates a process flow diagram in accordance with one embodiment.

FIG. 2 is a sequence diagram 200 illustrating example operations for probabilistic identification for content delivery, according to some embodiments of the present disclosure. In these embodiments, the sequence diagram 200 describes communications between the client device 104, third party server 154, the server device 102, entity data 134, and content items 140.

At operation 202, an entity 108 may access a website or an application hosted by the third party server 154. For example, the entity 108 may access the third party server 154 using a web browser on the client device 104. Alternatively the entity 108 may access the third party server 154 using a mobile application executing on the client device 104. The mobile application operating on the client device 104 can be a front-end of the application and the third party server 154 can operate the back-end of the mobile application. When the client device 104 accesses the website or the application, the third party server 154 may desire to deliver content to the entity 108. For example, the third party server 154 may desire to deliver any form of content described herein. However, the third party server 154 does not host the content itself. Instead, at operation 204, the third party server 154 sends a request to the server device 102 for the content.

In some embodiments, the request includes parameters regarding a type of content being requested. For example, the type of content may include a video, advertisement, image, GIF, text, document, graphic, audio data, or any other type of content described herein.

At operation 204, when the third party server 154 sends the request for content, the third party server 154 does not send identifying information that is deterministic regarding the identity of the entity 108. However, the request may include some data (e.g., referred to herein as "third-party data") associated with the entity 108 accessing the third party server 154 via the web browser or the application without actually specifying an identity of the entity 108. For example, the third party server 154 may send an Internet Protocol (IP) address used by the client device 104 executing the web browser or application, location information about the entity 108, and the like to the server device 102, and so forth. In another example, the third party server 154 may send data conforming to the Open Real-Time Bidding (OpenRTB) standard such as data known or derived about the entity 108. OpenRTB is a standardized protocol developed to facilitate the automated buying and selling of digital advertising inventory through real-time auctions. In this example, the data may include an exchange-specific identifier, a keyword, interest, or intent of the entity, consent data, a device type of the client device 104, a device make, model, operating system, operating system version, hardware version, or physical characteristics of the client device 104, version of Flash supported by the browser used by the client device 104, a browser type used by the client device 104, mobile carrier (if any) associated with the client device 104, network connection type, or any other suitable data.

Figure 5:
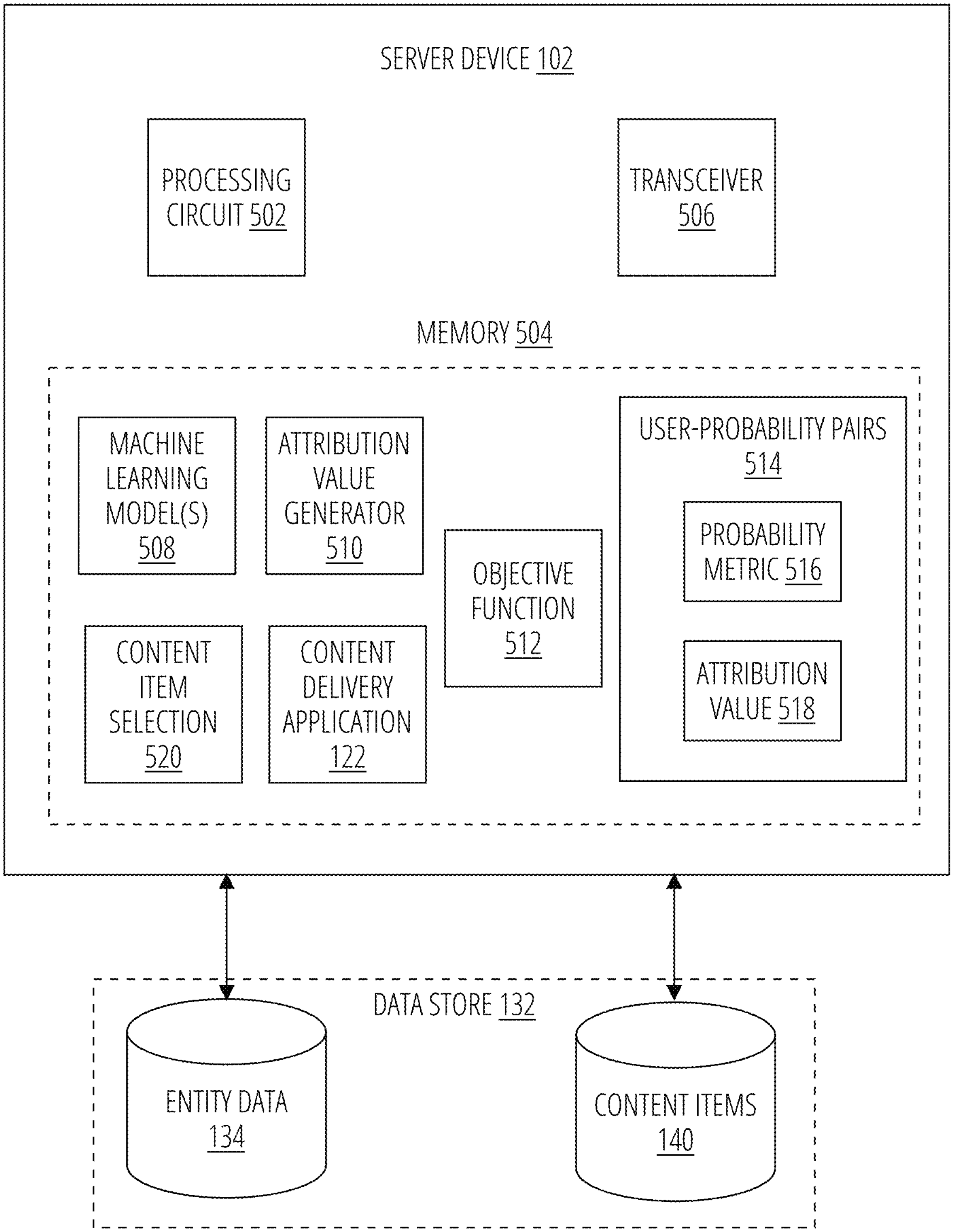
FIG. 5 illustrates a block diagram of a server device in accordance with one embodiment.

However, the third party server 154 does not send deterministic data to the server device 102. For example, deterministic data is any personal identifying information (PII) that specifically and uniquely identifies an entity 108, such as a name, username, email address, phone number or other data that may be used by the server device 102 to directly identify the entity 108. As shown in FIG. 5, the server device 102 comprises at least a processing circuit 502 and a memory 504 having executable instructions stored thereon, which when executed by the processing circuit 502 causes the processing circuit 502 to perform various operations described herein.

At operation 206, the server device 102 is configured to begin the process of determining, based on the request, a set of user-probability pairs. A user-probability pair includes a predicted user identifier of a candidate user profile associated with the server device 102 and a corresponding probability (e.g., a probability metric) that the predicted user identifier (e.g., of the candidate user profile) is associated with the request from the third party server 154. The processing circuit 502 of the server device 102 is configured to use a probabilistic identity graph to analyze the third-party data and generate the probability (e.g., the probability metric) that the predicted user identifier is associated with the request from the third party server 154. Additional details regarding operations for determining the probability metric indicating that a candidate user profile is associated with the request from the 154 are described below, including in FIG. 3.

As used herein, the term "candidate user profile" refers to a user profile from the entity data 134 that has a given probability of being the entity 108 accessing the third party server 154. That is, the candidate user profile is a user profile of an entity that may be the entity that is actually accessing the third party server 154. As such, the user-probability pairs are made up of a subset of the user profiles in the entity data 134. The candidate user profile may also be referred to as a predicted user identifier. The predicted user identifier is the user identifier that the system disclosed herein predicts (with a corresponding probability) is possibly associated with the request.

For example, in some embodiments, the server device 102 will process all of the third-party data received in the request. The connection network system 100 includes one or more data stores 132 that includes entity data 134, also referred to as user profile data. That is, the entity data 134 includes a plurality of user profiles, each being identified using a user identifier. For example, User Profile A may be assigned user identifier "ABC123" and User Profile B may be assigned user identifier "ABC124". Each of these user profiles has profile attributes associated therewith, which is stored in the entity data 134. In some embodiments, the profile attributes include one or more of a name, occupation, workplace, location, email address, demographic information, professional interests, education background, social interests, personal interests, or any other suitable attributes. In some embodiments, where the entity is a group of members or users, the profile attributes include the above for the group of users or members. In some embodiments, where the entity is an organization or company, the profile attributes include one or more of business name, business type, business category, location, incorporation status and location, email address, or any other suitable attributes.

At operation 208, the server device 102 is configured to query the data store 132 for the entity data 134. For example, the query may be generated using the third-party data received in the request for content delivery from the 154. At operation 210, the data store 132 responds to the query with user profile entries that match the query.

At operation 212, the processing circuit 502 of the server device 102 is configured to compare the third-party data received from the third party server 154 in the request to the profile attributes in the user profiles stored in the entity data 134. The processing circuit 502 of the server device 102 is then configured to generate a probability metric for one or more user identifiers in the entity data 134 based on how much of the third-party data from the request matches the profile attributes of the user profile in the entity data 134.

In some embodiments, the processing circuit 502 is configured to determine the probability metric (e.g., the probability that a given user identifier associated with a user profile is the entity 108 accessing the third party server 154) by generating probabilistic identity graphs for the user identities in the database of user profiles. More details regarding probabilistic identity graphs are provided below in logic diagram 300 of FIG. 3. In some other embodiments, a machine learning model, such as ML model 1220 can be used to generate (or can be used to assist with generating) the probability metrics described herein.

Each of the user profiles is indexed using a unique user identifier, as described above. Some user identifiers may be eliminated completely (e.g., no probability metric generated for the user profile) based on filtering the user profile data based on the third-party data received in the request. That is, every user profile in the entity data 134 may not receive a probability metric. Alternatively, the server device 102 may assign a probability metric to all user identifiers, and then eliminate one or more using filters based on a probability threshold (e.g., eliminate all user identifiers with corresponding probability metric of less than 1%).

The processing circuit 502 of the server device 102 is configured to generate a set of user-probability pairs that includes one or more user-probability pairs. Each user-probability pair in the set includes a predicted user identifier corresponding to one of the user profiles in the entity data 134 and the probability that the predicted user identifier is associated with the entity 108 that is accessing the webpage or application on the third party server 154.

In some embodiments, the server device 102 is configured to assign an attribution value to each of the user-probability pairs in the set. The attribution value can be a value associated with the user profile that implies how relevant one or more items of content are to the entity 108 associated with the user profile and how much value sending the content will bring to the connection network platform 112. For example, the entity 108 may choose to interact with the content, and the third party that operates the third party server 154 may pay the connection network platform 112 for that interaction. This, in turn, brings value to the connection network platform 112. Different user profiles may be more valuable to the connection network platform 112 and/or the third party server 154 based on what content items are distributed to the third party server 154 or how many content items are distributed. In some embodiments, for example, the attribution value may be calculated based on a metric, such as short-term revenue, long-term revenue, number of engagements, activity data, predicted click-through-rate (pCTR), predicted conversion (pCVR), job title, job description, purchase history, company, industry, sector, demographic data, location data, and other metrics. Embodiments are not limited to these examples.

In some embodiments, to determine the attribution value of each user profile, an average attribution value for different content options is determined for each user identifier in the user-probability pair. For example, in some embodiments, a user identifier is identified from the set of user-probability pairs. The server device 102 then queries the entity data 134 for information about the user profile associated with the user identifier. The information about the user profile (e.g., demographic data, location, etc.) is then compared to different content options and a determination is made as to how relevant the content options are to the user profile based on the information about the user profile and known information about the content options. Then an auction is performed with the different content options.

For example, "User123" may have user profile data in the connection network platform 112 as being female, located in the southeastern United States, working as a chemist, and thirty years old. Several different content options include Content Item 1, an advertisement for a chemical equipment company, Content Item 2, a trailer for a movie in French, and Content Item 3, a political video for US citizens to register to vote. Each of these content options is sponsored by a fourth party (e.g., an advertiser, political action committee, movie studio, production company, etc.) that generated the content and wishes to distribute the content via the connection network system 100 or the third party server 154. Each of the content options will be assigned (e.g., by the processing circuit 502) an attribution value associated with "User123". In some embodiments, the attribution value is determined based on a probability that "User 123" will interact with (e.g., click on, share, view, etc.) the content item and the amount the fourth party is willing to pay for an interaction with the content item.

In some embodiments, one or more machine learning (ML) models can be used to determine the probability that the entity 108 will interact with the content item. For example, the ML model(s) can be trained using public facing input data based on previous interactions with the content items and data regarding the profile attributes associated with the user profile. In some embodiments, the ML model 1220 described in FIGS. 8-10 can be used to generate the probability indicating that the entity 108 will interact with the content item. Note, this probability that the entity will interact with the content item is a separate probability from the probability metric assigned to the user identifier in the user-probability pair. The probability metric in the user-probability pairs indicates a probability that the user identifier is the entity 108 that is accessing the website of the third party server 154, whereas the probability here is the probability that the entity will interact with the content item under consideration.

In the above example, each user identifier in the set of user-probability pairs may be assigned an average attribution value which is defined as the average attribution value for the user identifier for the content options. For example, assuming Content Items 1-3 were the content options, "User123" would be assigned an average attribution value based on the average of the attribution values assigned to "User123" for Content Items 1-3. Assuming that the ML model determines that Content Item 1 (an advertisement for a chemical equipment company) is most likely to be interacted with by "User123" and Content Item 2 is the content item least likely to be interacted with by "User123," the attribute value for Content Item 1 for "User123" might be 5, the attribute value for Content Item 2 for "User123" might be 1, and the attribute value for Content Item 3 for "User123" might be 3. In this case, the average attribution value would be 3 for "User123".

Assume further, for the example, that the set of user-probability pairs includes "User123" and "User124". "User123" has an average attribute value of 3 and "User124" has an average attribute value of 2. This example user-probability pair set is illustrated in Table 1 below.

TABLE 1

| User ID | Probability Metric | Average Attribute Value |
|---|---|---|
| User123 | 70% | 3 |
| User124 | 30% | 2 |

In some other embodiments, as described herein, instead of individual user's the subject matter described herein can be applied to other types of entities, as well. For example, a group of entities may each have their own identifier associated therewith, along with a probability metric and average attribute value. Such an example group of entities is provided below in Table 2. This table provides a list of group-identity pairs whereby the group of users are anonymized and referenced by the Group Identifier.

TABLE 2

| Group ID | Probability Metric | Average Attribute Value |
|---|---|---|
| Group123 | 80% | 7 |
| Group124 | 20% | 1 |

Still at operation 212, the processing circuit 502 of the server device 102 is configured to apply an objective function to the set of user-probability pairs (or the set of group-probability pairs) to select one of the user identifiers with a corresponding candidate user profile. In some embodiments, the objective function defines one or more options for selecting one of the user identifiers. For example, in a first selection, the processing circuit 502 of the server device 102 is configured to select a random user identifier and associated user profile from the set of user-probability pairs. In a second selection, the processing circuit 502 of the server device 102 is configured to select the user identifier and candidate user profile having a greatest average attribution value associated therewith.

In some cases, the average attribution value is not included or is missing for a particular entity. In this case, a random User ID is selected.

In some embodiments, the processing circuit 502 of the server device 102 determines whether to make the first selection or the selection described above. For example, in some embodiments, the processing circuit 502 of the server device 102 is caused to execute the first selection or the second selection based on a selection parameter that is determined based on an outcome of an online A/B testing execution. The outcome of the A/B testing execution determines the selection parameter, referred to as epsilon. In some embodiments, for epsilon-percent of executions, the first selection (e.g., randomly selecting a user identifier and associated user profile) is made. For example, if epsilon (ε) is 0.3 (e.g., 30%), 30% of the time, the first selection is executed. For (1−epsilon)-percent of the time, the second selection is executed (e.g., the user identifier and candidate user profile having a greatest average attribution value associated therewith is selected). Using the epsilon=0.3 example from above, the second selection would be made 1-0.3=0.7, or 70% of the time. To summarize the above example, there is a 30% likelihood that a random user identifier from the set of user-probability pairs is selected, and there is a 70% chance that the user identifier with the highest average attribution value. This is just one example and should not be construed as limiting the embodiments described herein.

Pseudocode Excerpt 1 below illustrates an example embodiment of how the objective function may work.

```
ε=configured value;
for % of
  executions=selectRandomUserIdentifierFromList( );
else
for (1−ε) % of
  executions=selectUserIdentifierFromListWithHighest
  AttributeValue( );
```

Pseudocode Excerpt 1

Where ε is a percentage or number between 0 and 1 indicating a percentage based on an outcome(s) of the A/B test output.

According to some other embodiments, in a third selection, the processing circuit 502 of the server device 102 is configured to select the user identifier and candidate user profile having the highest probability metric associated therewith. In a fourth selection, the processing circuit 502 of the server device 102 is configured to select the user identifier and candidate user profile having the highest average attribution value among a subset of the set of user identifiers with a probability metric above a predetermined threshold. For example, in the fourth selection, the user identifier with the highest average attribution value among a subset of user identifiers in the set that has a probability metric of greater than 10%.

In another example embodiment, techniques referred to as Thompson sampling may be used to make the selection. Thompson sampling is a method used in machine learning and statistics for solving the multi-armed bandit problem, which is a problem of decision-making under uncertainty. The goal is to maximize the cumulative reward over a series of trials by choosing from a set of options (or "arms"), each with an unknown probability of providing a reward. In the context of the present disclosure, it is unclear which of the user identifiers is associated with the request for content at the third party server 154. As such, Thompson sampling may be an algorithm used for selecting one of the user identifiers.

Thompson sampling begins with initializing a prior distribution for the probability of reward for each arm (e.g., each user identifier), which can be based on prior knowledge or assumed to be uniform if no prior knowledge is available. In each trial, a probability of reward is sampled from the current posterior distribution for each arm. The arm with the highest sampled probability is then selected. After observing the reward from the chosen arm, the posterior distribution for that arm is updated based on the observed reward. This process is repeated for each trial, continually updating the posterior distributions and selecting arms based on the sampled probabilities. This method effectively balances exploration and exploitation, making it useful in various applications like online advertising, clinical trials, and recommendation systems.

Once the user identifier from the user-probability pair is selected according to the description herein, the processing circuit 502 of the server device 102 is configured to access the candidate user profile of the selected user identifier in the entity data 134 to determine a set of attributes of the candidate user profile. These attributes may include any of the attributes described herein. For example, the attributes may include one or more of the following: name, occupation, workplace, location, email address, demographic information, professional interests, education background, social interests, personal interests, or any other suitable attributes. The processing circuit 502 may use an ML model or any other suitable algorithm to select, based on the request (e.g., the request for content that was originally sent from the third party server 154 to the server device 102) and the set of attributes of the candidate user profile of the selected user identifier, a content item from a plurality of content item options to be sent to the third party server 154.

For example, the server device 102 may generate a query based on the attributes of the candidate user profile, the attribution value of the user identifier, the request that was originally sent, etc. At operation 214, the server device 102 can send the query to the data store 132 which stores content items 140. At operation 216, the content items 140 portion of the data store 132 can respond with the selected content item based on the query generated by the server device 102. In some embodiments, the processing circuit being caused to select the content item (e.g., generate the query for a content item) that corresponds to the parameters of the content being requested. For example, as described above, the parameters included in the request from the third party server 154 to the server device 102 can include that the content item be a video. The query sent at operation 214 will include that the content item be a video, and at operation 216, the content items 140 section of the data store 132 will respond to the query for a content item with a video. In some other embodiments, the content item may be ca graphical user interface (GUI) element.

At operation 218, the server device 102 sends the selected content item to the third party server 154. Finally, at operation 220, the third party server 154 delivers the content to the client device 104 by causing the content to be displayed on the website that the entity 108 is accessing or the application being executed on the client device 104.

Figure 3:
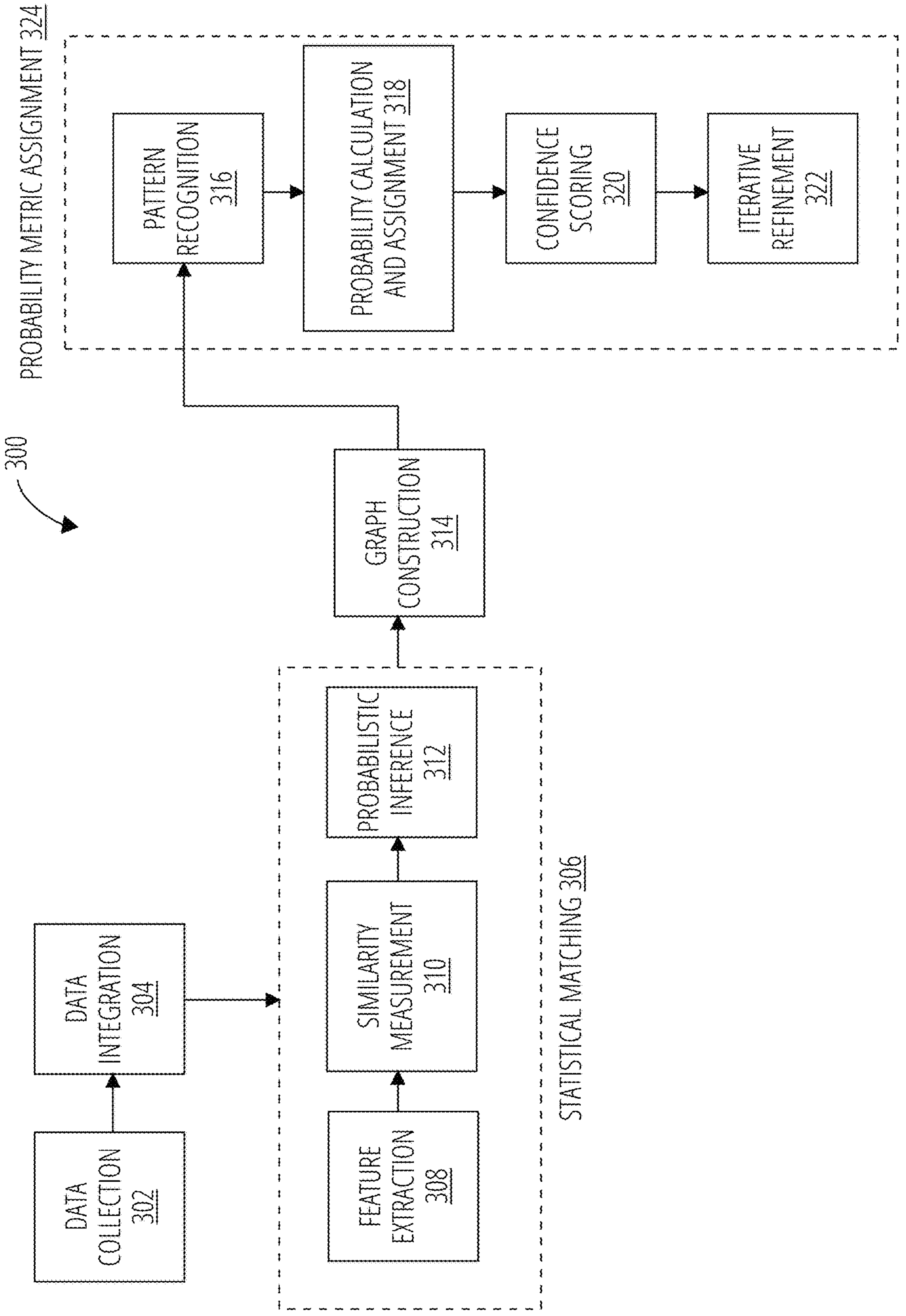
FIG. 3 illustrates a logic diagram in accordance with one embodiment.

FIG. 3 is a logic diagram 300 illustrating some operations performed in the construction of a probabilistic identity graph that is then used to assign probability metrics to the user identifiers as described herein. A probabilistic identity graph is a sophisticated tool used in data analytics to create a comprehensive view of a user by linking various data points through statistical probabilities and patterns. Unlike deterministic identity graphs, which rely on explicit identifiers like email addresses or phone numbers, probabilistic identity graphs use data points such as device IDs, IP addresses, and user (e.g., entity) behavior to make educated guesses about user identities. This approach allows data analysts to connect data from entities whose PII hasn't been explicitly shared.

One of the key features of probabilistic identity graphs is their ability to utilize diverse data sources. By leveraging device IDs, IP addresses, and user behavior (e.g., third-party data shared by the third party server 154 described herein), these graphs employ algorithms and machine learning to identify patterns and make probabilistic matches. This statistical matching process enables the creation of a unified user profile, even when explicit identifiers are not available. As a result, data analysts can gain insights into user behavior and preferences that would otherwise be difficult to obtain. In summary, probabilistic identity graphs offer a powerful way to connect disparate data points and create a unified view of users. By using statistical probabilities and patterns, these graphs can provide a more comprehensive understanding of user behavior and preferences.

Referring back to logic diagram 300, generating a probabilistic identity graph involves several key operations, each leveraging statistical methods and diverse data sources to create a unified view of user identities. In some embodiments, generating a probabilistic identity graph begins with data collection 302. In embodiments described herein, this involves the processing circuit 502 gathering and receiving third-party data from the third party server 154 as described herein. In some other embodiments, this operations involves gathering data from various other sources as well. For example, from internet service providers, and the like. As described herein, gathering the third-party devices includes gathering device IDs, IP addresses, browsing behavior, app usage, and other digital footprints. These data points are collected from websites, mobile apps, and third-party data providers.

In some embodiments, another operation in the probabilistic identity graph generation process involves data integration 304. Once the data is collected, it may be helpful to integrate the data into a central system. This involves normalizing the data to ensure consistency and compatibility. Duplicates may be removed and missing values managed. The data is then stored in a way that allows for efficient processing and analysis.

In some embodiments, the next operation in the probabilistic identity graph generation process involves statistical matching 306, an important operation in probabilistic identity graph creation. In this complex operation, multiple suboperations are involved, including applying algorithms and machine learning models to the normalized data to analyze the collected data for identifying patterns and correlations. For example, if a particular device ID and IP address frequently appear together, the system might infer that they belong to the same entity. This process involves making educated guesses based on probabilities rather than definitive matches. To make these educated guesses, several sub-operations are performed.

For example, in some embodiments, the process involves feature extraction 308 to extract relevant features from the collected and normalized third-party data. These features may include time stamps, location data, device types, and user interaction patterns. The goal is to identify attributes that can help distinguish and link different data points.

Next, in some embodiments, the process involves similarity measurement 310 between different data points. In these operations, various statistical models and algorithms are used such as logistic regression, Bayesian networks, and clustering algorithms. These models analyze the extracted features to calculate the probability that two data points belong to the same entity.

Then, based on the similarity measurements 310, probabilistic inference 312 techniques are applied to make educated guesses about user identities. This involves using algorithms like Expectation-Maximization (EM) and Hidden Markov Models (HMM) to iteratively refine the probability estimates. The system continuously updates these probabilities as new data is collected, improving the accuracy of the identity graph over time.

Once the various operations of the statistical matching 306 are complete, graph construction 314 can begin. This involves linking the matched data points to create a network of connections that represent user identifiers. Finally, the matched data points are linked to construct the identity graph. The graph is continuously refined as more data becomes available, ensuring that the user identities remain accurate and up-to-date. The resulting graph provides a comprehensive view of user interactions across different devices and touchpoints, allowing data analysts to better understand and target their audience. By leveraging these statistical techniques, probabilistic identity graphs can provide a comprehensive and nuanced view of the user identifiers, even in the absence of explicit deterministic data.

Once a probabilistic identity graph is constructed, probability metric assignment 324 can begin. In this operation, probabilities are assigned to user identifiers through a series of sophisticated algorithms and statistical methods. For example, in some embodiments, probability metric assignment 324 may begin with pattern recognition 316. In this operation, the server device 102 analyzes the collected data to identify patterns and correlations. For example, it looks at how often certain device IDs and IP addresses appear together, or how user behavior on different devices might be similar. These patterns help the server device 102 make educated guesses about which data points belong to the same user.

In some embodiments, based on the identified patterns, the processing circuit 502 is configured to perform probability calculation and assignment 318 to determine the probability metric to be assigned to each user identifier. This involves the processing circuit 502 being configured to calculate the probability that different data points belong to the same user. To execute this operation, the processing circuit 502 is configured to utilize one or more statistical models and machine learning algorithms to generate and assign the probability metrics. For instance, if a device ID and an IP address frequently appear together with a known user identifier from the entity data 134, the processing circuit 502 might assign a high probability that the entity accessing the third party server 154 is the user identifier. The above statistical models may include logistic regression models, Bayesian networks, Hidden Markov Models (HMM), or Expectation-Maximization (EM) algorithms. Each of these approaches can be performed using a machine learning model, such as machine learning model(s) 508 that have been trained and designed to perform one of the statistical models described herein.

A logistic regression model is used to predict the probability of a binary outcome based on one or more predictor variables. In the context of identity graphs, logistic regression can help determine the likelihood that two data points belong to the same user identifier based on their features. Bayesian networks are graphical models that represent the probabilistic relationships among a set of variables. They are particularly useful for modeling the dependencies between different data points and updating probabilities as new data is observed. HMMs are used to model systems that transition between states in a probabilistic manner. They are useful for tracking entity behavior over time and making inferences about user identifiers based on observed sequences of actions. An EM algorithm is an iterative algorithm that is used to find maximum likelihood estimates of parameters in statistical models, particularly when the model depends on unobserved latent variables. In identity graphs, the EM algorithm helps refine probability estimates by iteratively updating the model parameters based on the observed data.

Next, in some embodiments, confidence scoring 320 is performed. In this operation, each connection in the identity graph is assigned a confidence score, which represents the likelihood that the linked data points belong to the same user. These scores are continuously updated as new data is collected and analyzed. Higher confidence scores indicate stronger, more reliable connections.

Finally, in some embodiments, the operations described herein are iterative and includes iterative refinement 322. Meaning the system continuously refines its probability calculations and metrics as more data becomes available. This helps improve the accuracy of the identity graph over time, reducing the uncertainty and increasing the reliability that the probability metrics are more likely to correctly predict that the user identifier is associated with the entity accessing the third party server 154.

Figure 4:
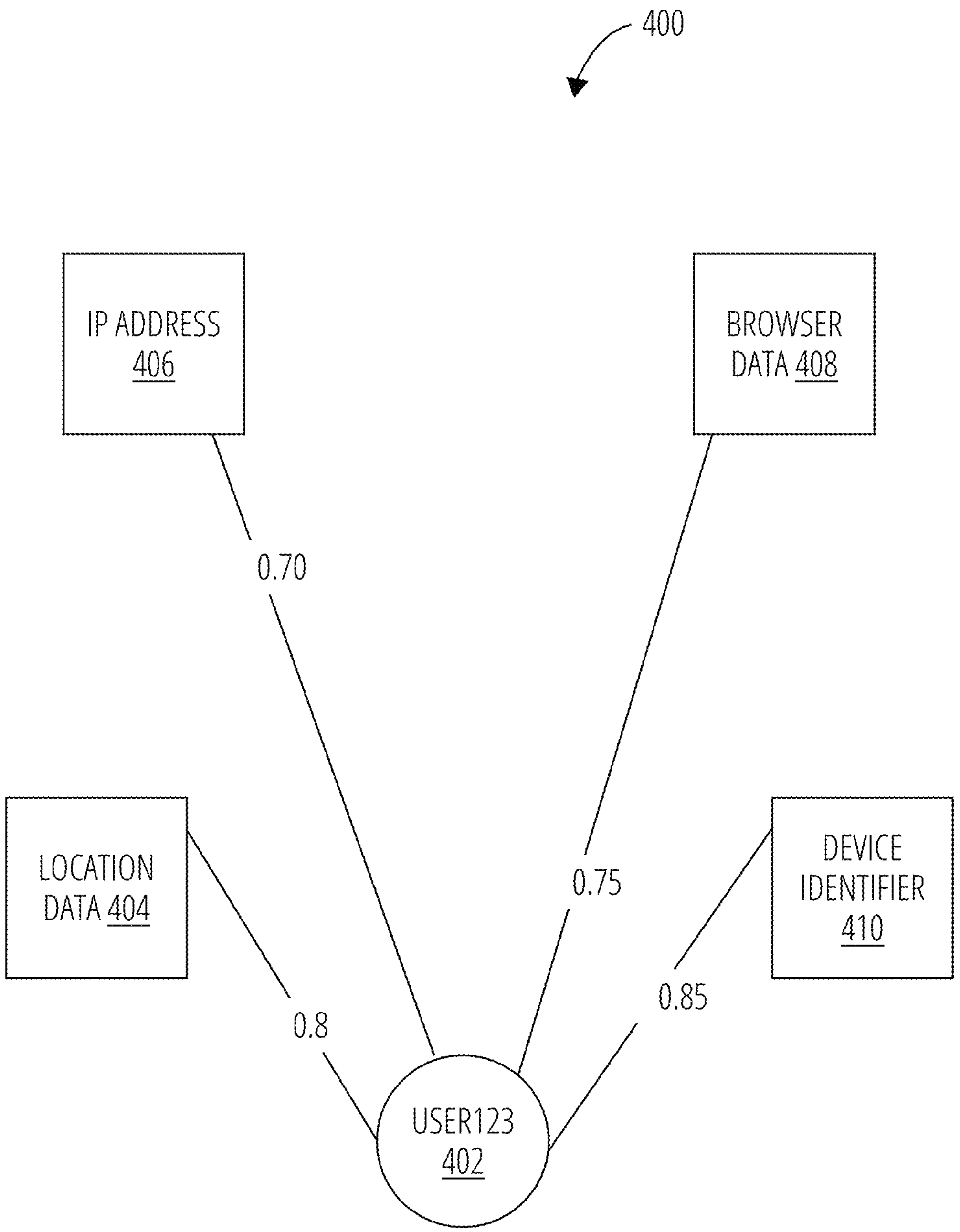
FIG. 4 illustrates an example probabilistic identity graph in accordance with one embodiment.

FIG. 4 illustrates an example probabilistic identity graph 400 according to some embodiments of the present disclosure. In this example, a single user identifier, User123 402, is shown. However, in some embodiments, a larger probabilistic identity graph 400 can include a plurality of user identifiers. For example, a probabilistic identity graph 400 can be generated that includes each of the user identifiers in the set of user-probability pairs and how each of those user probability pairs connects to the third-party data about the entity 108 received from the third party server 154.

In this example, the third-party data received from the third party server 154 about the entity 108 accessing the third party server 154 includes location data 404, an IP address 406, browser data 408, and a device identifier 410 of a computing device being used by the entity 108 to access the third party server 154. In some embodiments, other third-party data may be received and added to the probabilistic identity graph 400.

As described above, the User123 402 has a set of attributes in the user profile associated therewith in the entity data 134. The processing circuit 502 is configured to analyze the set of attributes of the user profile associated with the User123 402, which may include previous IP addresses used by the User123 402 when accessing its user profile on connection network platform 112. The attributes may also indicate location data of User123 402 or a device identifier of the device used by the User123 402 when accessing its user profile on connection network platform 112. In other examples, the attributes may indicate an exchange-specific identifier, a keyword, interest, or intent of the entity 108, consent data, a device type of the client device 104, a device make, model, operating system, operating system version, hardware version, or physical characteristics of the client device 104, version of Flash supported by the browser used by the client device 104, a browser type used by the client device 104, mobile carrier (if any) associated with the client device 104, network connection type, or any other suitable data.

In some embodiments, the processing circuit 502 of the server device 102 is configured to generate the probabilistic identity graph 400 by using the statistical and machine learning models described above to generate the probabilistic identity graph 400. The statistical models described above, along with the set of attributes of the user profile, are used to generate connections between the User123 402 and the location data 404, IP address 406, browser data 408, and device identifier 410 of the third-party data. These connections are assigned probabilities as described above indicating a probability that the User123 402 is connected to the third-party data based on the statistical analysis described above. Once the probabilistic identity graph 400 is generated, the overall probability metric can be generated using the statistical models described above and based on the individual probability connections made between the User123 402 and the third-party data (e.g., location data 404, IP address 406, browser data 408, and device identifier 410).

In this example, the execution of the statistical models described above assigned a probability that the User123 402 is 80% likely to be associated with the location data 404, 70% likely to be associated with the IP address 406 data, 75% likely to be associated with the browser data 408, and 85% likely to be associated with the device identifier 410 data. Looking at these connections wholistically, the processing circuit 502 may execute further statistical models described above, and assign the User123 402 a 70% likelihood that the User123 402 is associated with the entity 108 accessing the third party server 154.

In some embodiments, a probabilistic identity graph 400 can be generated for each user identifier in the set of user-probability pairs. Using each probabilistic identity graph 400 generated, the processing circuit 502 can calculate the probability metric for each user identifier in the set.

FIG. 5 illustrates a block diagram of an example server device 102 according to some embodiments of the present disclosure. In some embodiments, as described above, the server device 102 includes a processing circuit 502 for executing instructions stored in a memory 504, and a transceiver 506 for receiving and transmitting data. For example, the transceiver 506 can be used to receive or transmit data to any of the client device 104, the data store 132, the client application 110, the network 106, or the third party server 154 as described herein.

In some embodiments, the processing circuit 502 comprises any suitable processing circuit such as a processor, a microprocessor, a multi-core processor, a graphics processing unit (GPU), a central processing unit (CPU), application specific integrated circuit (ASIC), or any other suitable processor that can execute instructions and perform functions described herein. The memory 504 can include any suitable memory device such as random access memory (RAM), read only memory (ROM), a hard drive, a solid state drive, non-volatile RAM (NVRAM), combinations thereof, or any other suitable memory device capable of performing the functions described herein. In some embodiments, the transceiver 506 may include a hardware and/or software component, including a physical network transceiver capable of transmitting and receiving digital information, data, and/or packets, via a network connection. The transceiver 506 may also be a wireless transceiver (e.g., using an antenna to receive and transmit data). The transceiver 506 may further include software designed to operate therewith to be executed by the processing circuit 502 or another processor associated with the transceiver 506 to process the data being transmitted or received.

In some embodiments, the server device 102 may further comprise or execute one or more machine learning model(s) 508 that have been trained using public and/or private data. The machine learning model(s) 508 can include any suitable machine learning model trained to perform the functions described above. For example, the machine learning model(s) 508 may be trained to receive input data and output a probability based on the data as described above. In another example, the machine learning model(s) 508 may be trained to receive user profile attributes and work with the attribution value generator 510 to output attribution values 518, as described above. One or more other machine learning model(s) 508 may be trained and used by the server device 102 as well. In some embodiments, the ML model 1220 described in FIGS. 8-10 can be used to implement machine learning model(s) 508.

In some embodiments, the server device 102 further includes an objective function 512 as described above. The server device 102 further includes the user-probability pairs 514 as they are generated and stored in memory 504. Table 1 illustrates an example data structure that includes a set of user-probability pairs 514 generated as described herein, and includes a set of probability metrics 516 with corresponding attribution values 518.

In some embodiments, the memory 504 further stores an algorithm for content item selection 520. This algorithm can be performed as described herein and in conjunction with the machine learning model(s) 508 or any other suitable function or component within the server device 102. Moreover, the server device 102 is configured to communicate with the data store 132 as described herein to access entity data 134 to generate the user-probability pairs 514 and to select content for the selected user identifier. The server device 102 may further communicate with the data store 132 to select a content item from the content items 140 to send to the third party server 154 as described herein. A content delivery application 122 can be executed by the processing circuit 502 to transmit the selected content item to the third party server 154.

Figure 6A:
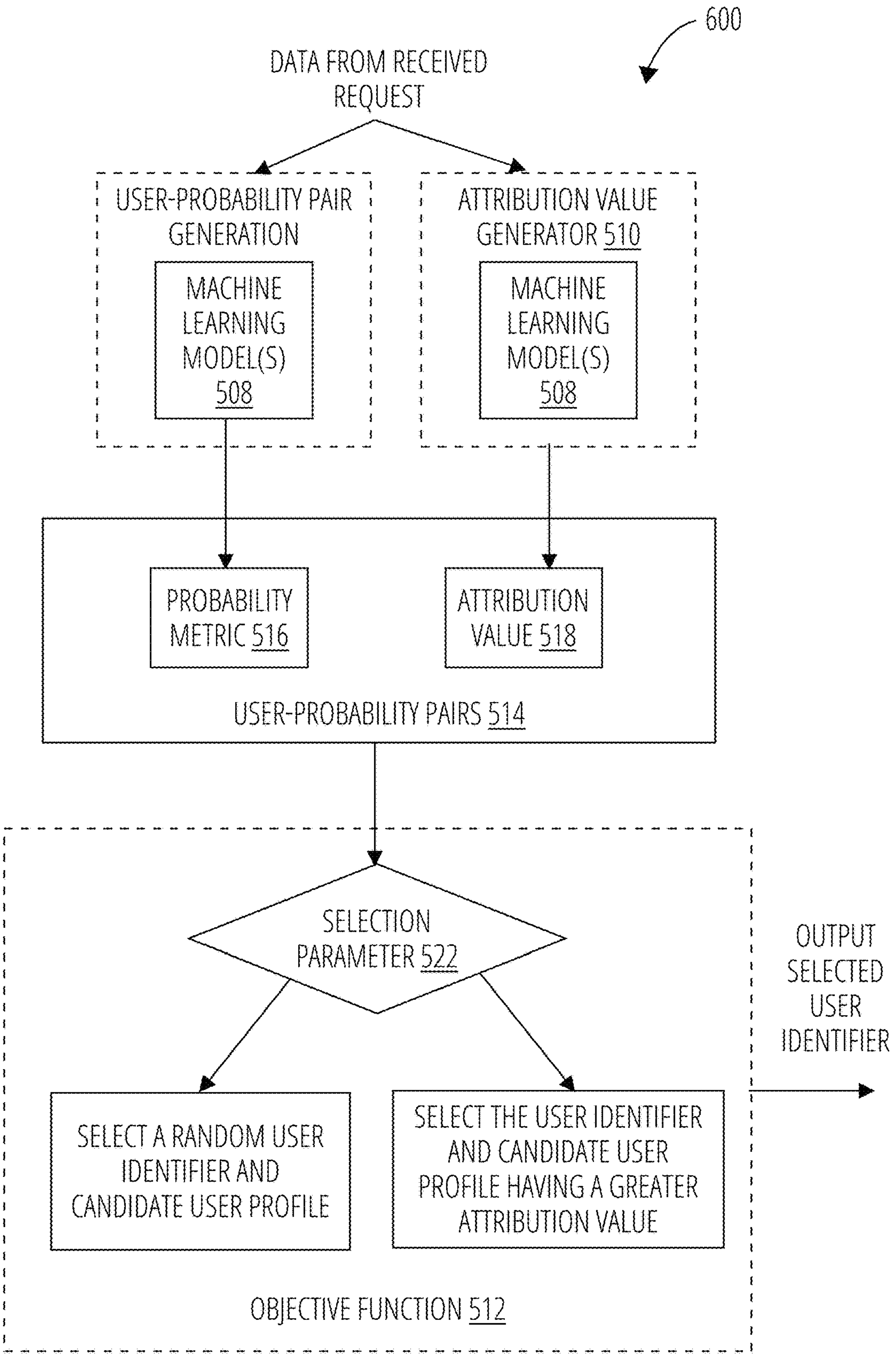
FIG. 6A illustrates a logic diagram in accordance with one embodiment.

FIG. 6A illustrates a logic diagram 600 depicting some operations performed by the server device 102 according to embodiments of the present disclosure. This figure provides a logical diagram depicting how the server device 102 selects a user identifier as the probable entity 108 that is accessing the website or the application.

First, the request from the third party server 154 is received by the server device 102 that includes some data (e.g., the third-party data from above) about the entity 108 accessing the website or the application executed by the third party server 154. However, as described above, the third-party data is not specific enough to have a deterministic outcome. For example, the third-party data received from the third party server 154 can include the IP address used by the client device 104 executing the web browser or application, location information about the entity 108, and the like to the server device 102. In another example, the third-party data may include an exchange-specific identifier, a keyword, interest, or intent of the entity, consent data, a device type of the client device 104, a device make, model, operating system, operating system version, hardware version, or physical characteristics of the client device 104, version of Flash supported by the browser used by the client device 104, a browser type used by the client device 104, mobile carrier (if any) associated with the client device 104, network connection type, or any other suitable data, but does not send deterministic data. That is, PII, such a name, username, email address, phone number or other data that may be used by the server device 102 to directly identify the entity 108 is not sent from the third party server 154 to the server device 102.

Once the server device 102 receives the request that includes the third-party data, the server device 102 is configured to generate the user-probability pairs 514 as described above. The server device 102 is configured to use the machine learning model(s) 508 to analyze the third-party data received in the request. Based on profile attributes of users in the user profiles in the entity data 134, the machine learning model(s) 508 is configured to output a probability that one or more of the user profiles in the entity data 134 is associated with the entity 108 that caused the request to be generated.

Each user profile has a corresponding user identifier associated therewith to identify the user profile in the entity data 134. In some embodiments, the server device 102 is configured to make a list or table of user-probability pairs 514, each entry in the list or table of user-probability pairs 514 including a user identifier of one of the user profiles found in the entity data 134. Moreover, each entry in the list or table of user-identity user-probability pairs 514 includes a probability metric 516 indicating a probability (e.g., generated by the machine learning model(s) 508) that the user identifier is associated with the entity 108 accessing the website or application managed by the server device 102.

Moreover, each entry in the table or list of user-probability pairs 514 includes an attribution value 518. The attribution value is determined by the server device 102 using the machine learning model(s) 508 and the attribution value generator 510 as described above. The processing circuit 502 then fetches the attribution value 518 for the corresponding user identifier and inserts the attribution value 518 into the table or list of user-probability pairs 514. The attribution value for a user identifier is an average attribution value of the user for a plurality of content items, as described above. The list or table of user-probability pairs 514 is then populated with a list of user identifiers and corresponding probability metric 516 and attribution value 518 for each user identifier in the list or table.

Once the list or table of user-probability pairs 514 is generated, the server device 102 is then configured to apply the objective function 512 and output a selected user identifier based on the outcome of the objective function 512. To execute the user-probability pairs 514, first a selection parameter 522 is generated. The selection parameter 522 is calculated based on an outcome of an online A/B testing execution. The A/B testing execution determines the selection parameter 522, referred to as epsilon from above. In some embodiments, for epsilon-percent of executions of the objective function 512, the server device 102 randomly selects a user identifier and associated candidate user profile from the user-probability pairs 514 list or table. For example, if epsilon is 0.3 (e.g., 30%), 30% of the time, the objective function 512 randomly selects a user identifier from the list or table of user-probability pairs 514. For (1−epsilon)-percent of the time, the objective function 512 selects the user identifier and candidate user profile having the greatest average attribution value associated therewith. Using the epsilon=0.3 example from above, the objective function 512 selects the user identifier having the greatest average attribution value 70% of the time. This is just one example and should not be construed as limiting the embodiments described herein.

Once the user identifier is selected, the logical process for determining the user identifier terminates and the selected user identifier is output, for example to a content item selection 520 process executed by the server device 102

Figure 6B:
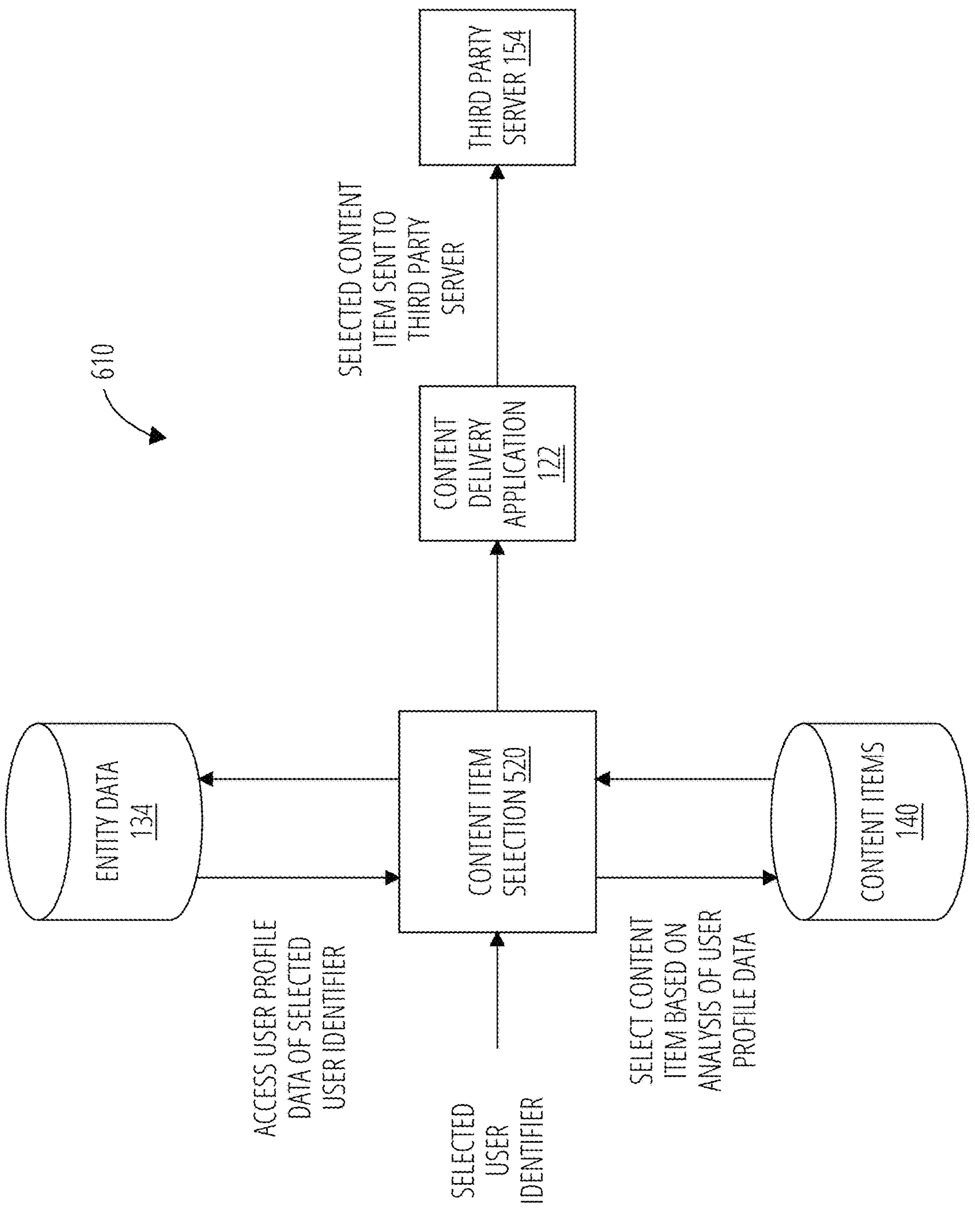
FIG. 6B illustrates a logic diagram in accordance with one embodiment.

FIG. 6B illustrates an example logic diagram 610 according to another embodiment of the present disclosure. This figure provides a visual representation of how the server device 102 determines what content to deliver to the third party server 154 based on the user identifier selected in FIG. 6A. In FIG. 6B, the selected user identifier is returned and input into the content item selection 520 process of the server device 102.

In embodiments where the objective function 512 selects the random user identifier, the content item selection 520 process accesses the entity data 134 and queries the user profile data of the selected user identifier. The content item selection 520 determines a set of profile attributes of the candidate user profile from the entity data 134 of the selected random user identifier. These profile attributes of the user profile associated with the selected user identifier may include any of the profile attributes described herein. For example, the profile attributes may include one or more of the following: name, occupation, birthdate, workplace, location, residency, mailing address, email address, phone number, demographic information, professional interests, education background, social interests, personal interests, or any other suitable attributes.

Once the profile attributes of the user profile associated with the user identifier are determined, the content item selection 520 accesses the content items 140. The content item selection 520 is further configured to input the determined profile attributes of the user identifier into an ML model, such as machine learning model(s) 508, to select, based on the request (e.g., the request for content that was originally sent from the third party server 154 to the server device 102), a content item from a plurality of content item options to be sent to the third party server 154. The machine learning model(s) 508 can have access to the content items 140 and select the appropriate content item based on a machine learning analysis of the content items 140 compared to the profile attributes of the user identifier. The content item selected by the machine learning model(s) 508 is sent to the content delivery application 122 and forwarded to the third party server 154 for display on the web browser of the client device 104 or in the application of the client device 104.

In another embodiment, where the objective function 512 selects the user identifier and candidate user profile having the greatest average attribution value, the content item with the greatest individual attribution value for that user profile is selected by the content item selection 520 process. Using the example from Table 1 above, assume "User123" has an average attribution value of 3 from among Content Item 1, Content Item 2, and Content Item 3. The attribution value for "User123" of Content Item 1 is 5, the attribution value for "User123" of Content Item 2 is 3, and the attribution value for "User123" of Content Item 3 is 1. Content Item 1 would be selected in this example.

The selected content item is then sent to the content delivery application 122 and forwarded to the third party server 154 for display on the web browser of the client device 104 or in the application of the client device 104.

Figure 7A:
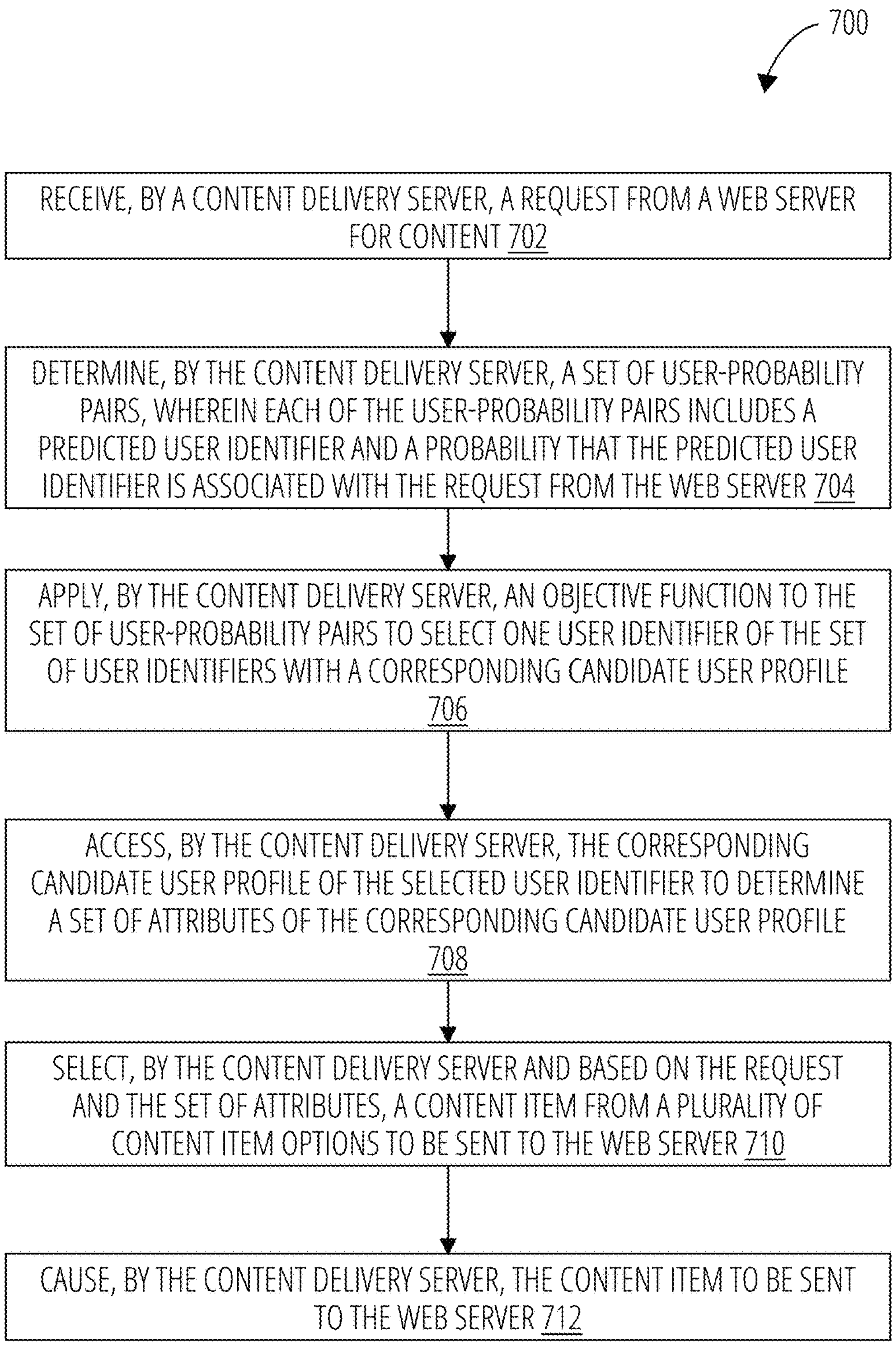
FIG. 7A is a flow diagram of an example method in accordance with one embodiment.

FIG. 7A is a flow chart illustrating various steps of an example method 700 of probabilistic identification for content delivery. As shown at block 702, some embodiments of the method 700 include receiving, by a content delivery server (e.g., the server device 102 of FIG. 1), a request from a web server for content. As shown at block 704, some embodiments of the method 700 include determining, by the content delivery server, a set of user-probability pairs, wherein each of the user-probability pairs includes a predicted user identifier and a probability that the predicted user identifier is associated with the request from the web server. As shown at block 706, some embodiments of the method 700 includes applying, by the content delivery server, an objective function to the set of user-probability pairs to select one user identifier of the set of user identifiers with a corresponding candidate user profile.

As shown at block 708, some embodiments of the method 700 includes accessing, by the content delivery server, the corresponding candidate user profile of the selected user identifier to determine a set of attributes of the corresponding candidate user profile. As shown at block 710, some embodiments of the method 700 includes selecting, by the content delivery server and based on the request and the set of attributes, a content item from a plurality of content item options to be sent to the web server. As shown at block 712, some embodiments of the method 700 includes causing, by the content delivery server, the content item to be sent to the web server.

Figure 7B:
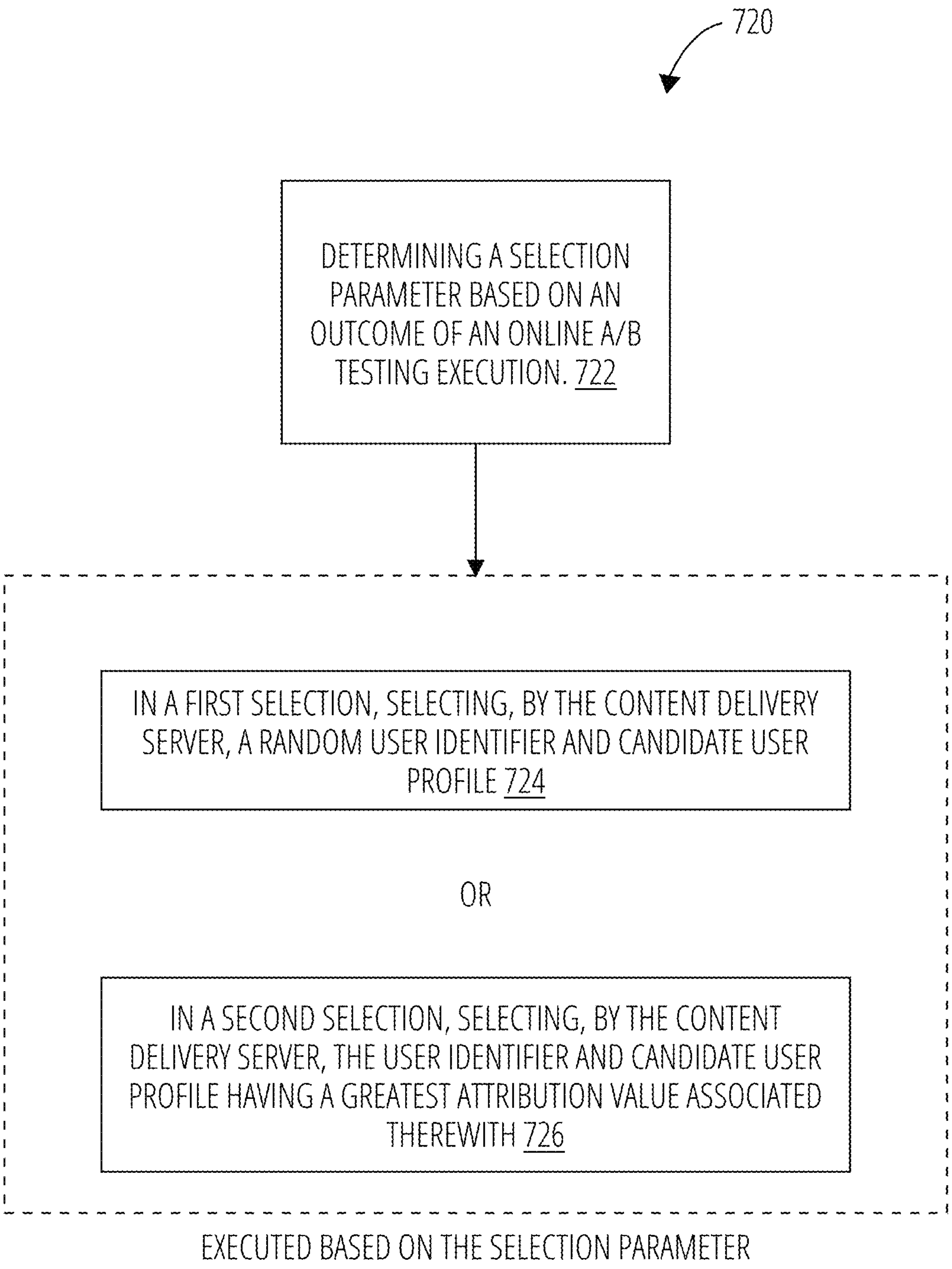
FIG. 7B is a flow diagram of another aspect of the method described in FIG. 7A in accordance with one embodiment.

FIG. 7B is a flow chart illustrating method 720, which provides additional steps in the method 700 from FIG. 7A. For example, as shown in block 722, in some embodiments, the method 700 includes determining a selection parameter based on an outcome of an online A/B testing execution. As shown at block 724, in some embodiments, the method 700 includes, in a first selection, selecting, by the content delivery server, a random user identifier and candidate user profile. As shown at block 726, in some embodiments, the method 700 includes, in a second selection, selecting, by the content delivery server, the user identifier and candidate user profile having a greatest attribution value associated therewith. The method 700 is executed such that either the first selection in block 724 or the second selection in block 726 is made based on the determined selection parameter.

Figure 8:
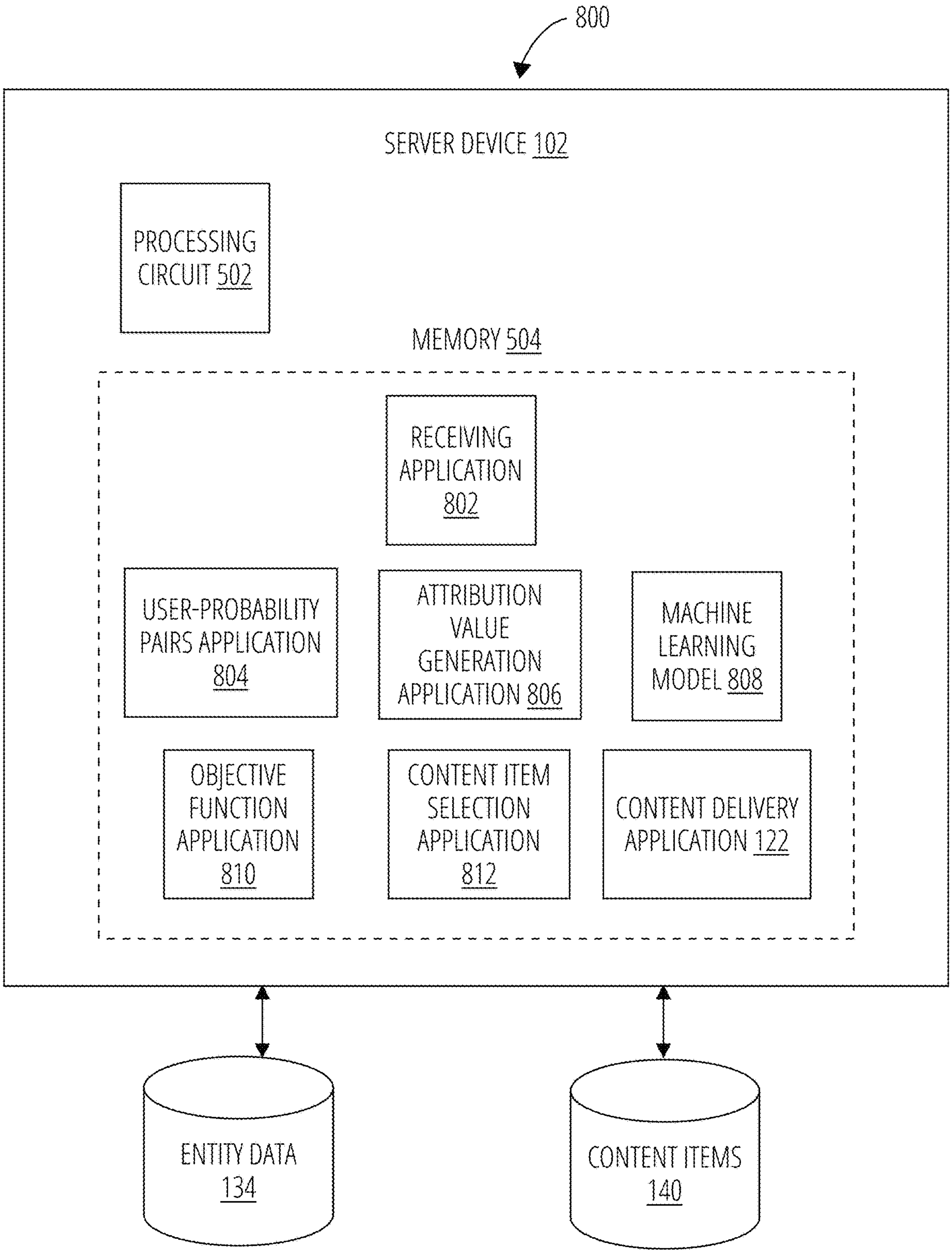
FIG. 8 is a block diagram of a server device in accordance with one embodiment.

FIG. 8 is a block diagram illustrating an example application environment 800 according to some embodiments of the present disclosure. Similar to the block diagram illustrated in FIG. 5, application environment 800 illustrates various applications operating on the server device 102 according to some embodiments of the present disclosure. As described above, the server device 102 includes the processing circuit 502 and memory 504. In some embodiments, stored within memory (e.g., in RAM, hard drive, etc.) are a plurality of applications including receiving application 802, machine learning model 808, attribution value generation application 806, user-probability pairs application 804, objective function application 810, content item selection application 812, and content delivery application 122. One or more of these applications can be integrated into a single application or single file, or one or more of the applications may be split into several different applications or files.

In some embodiments, the receiving application 802 is executed by the processing circuit 502 and configured to receive third-party data and the request described above from the third party server 154. The receiving application 802 may also receive and handle query responses from the entity data 134 and/or the content items 140.

User-probability pairs application 804 handles generation and assignment of the user-probability pairs 514 described above. The user-probability pairs application 804 may include instructions for executing an algorithm such as construction of a probabilistic identity graph that is then used to assign probability metrics to the user identifiers as described herein. The user-probability pairs application 804 may include its own machine learning model 808 or it may leverage or utilize machine learning model 808 to generate the probabilistic identity graph, as described herein.

In addition, the memory 504 includes attribution value generation application 806 that can implement algorithms and operations described herein for assigning attribution values to each of the user identifiers in the user-probability pairs 514. The attribution value generation application 806 both determines the attribution value for each content item for each user identifier in the user-probability pairs 514, but also determines the average attribution value for each user identifier on the user-probability pairs 514 as described herein.

Figure 12:
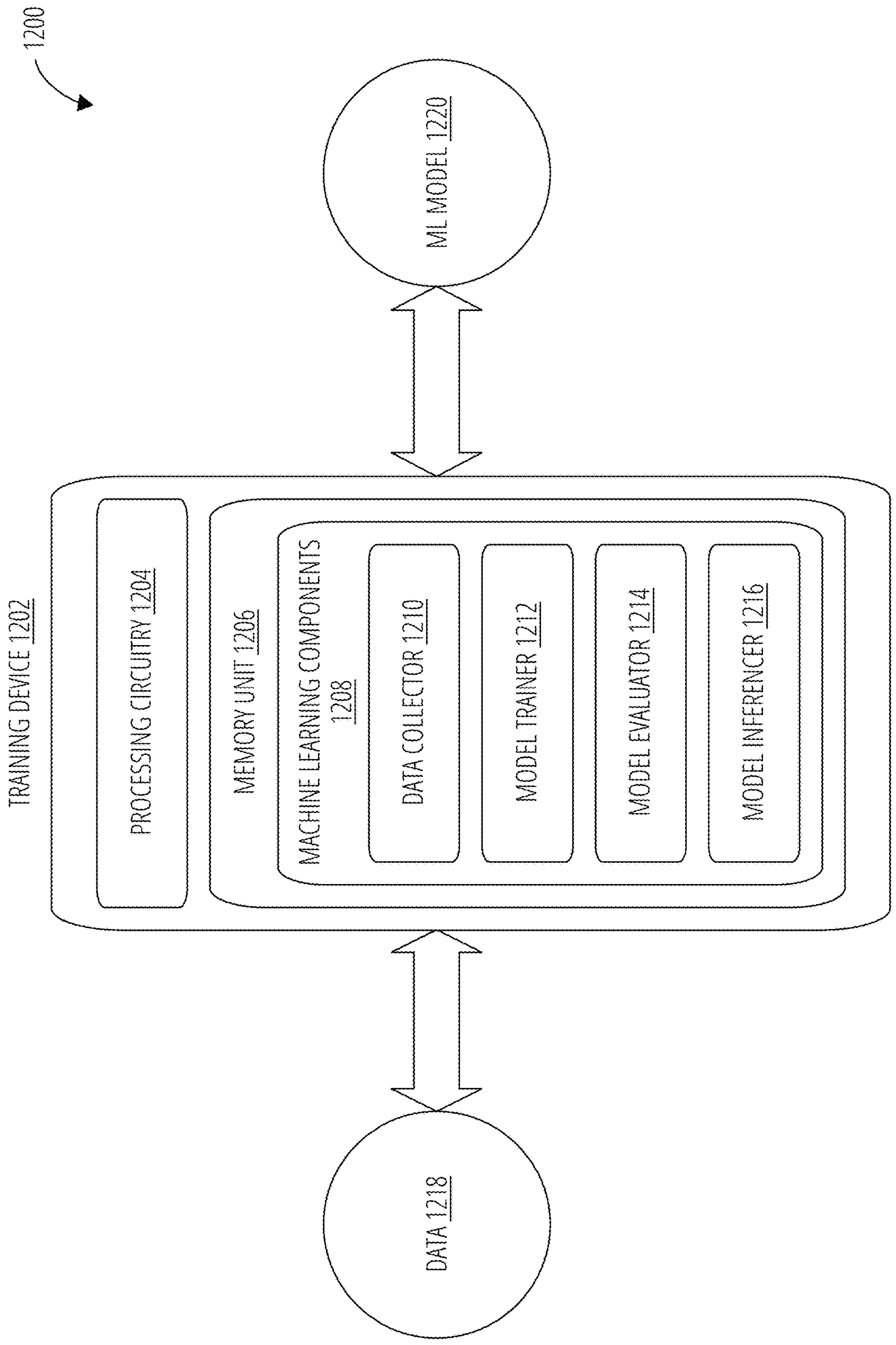
FIG. 12 illustrates an apparatus in accordance with one embodiment.
Figure 13:
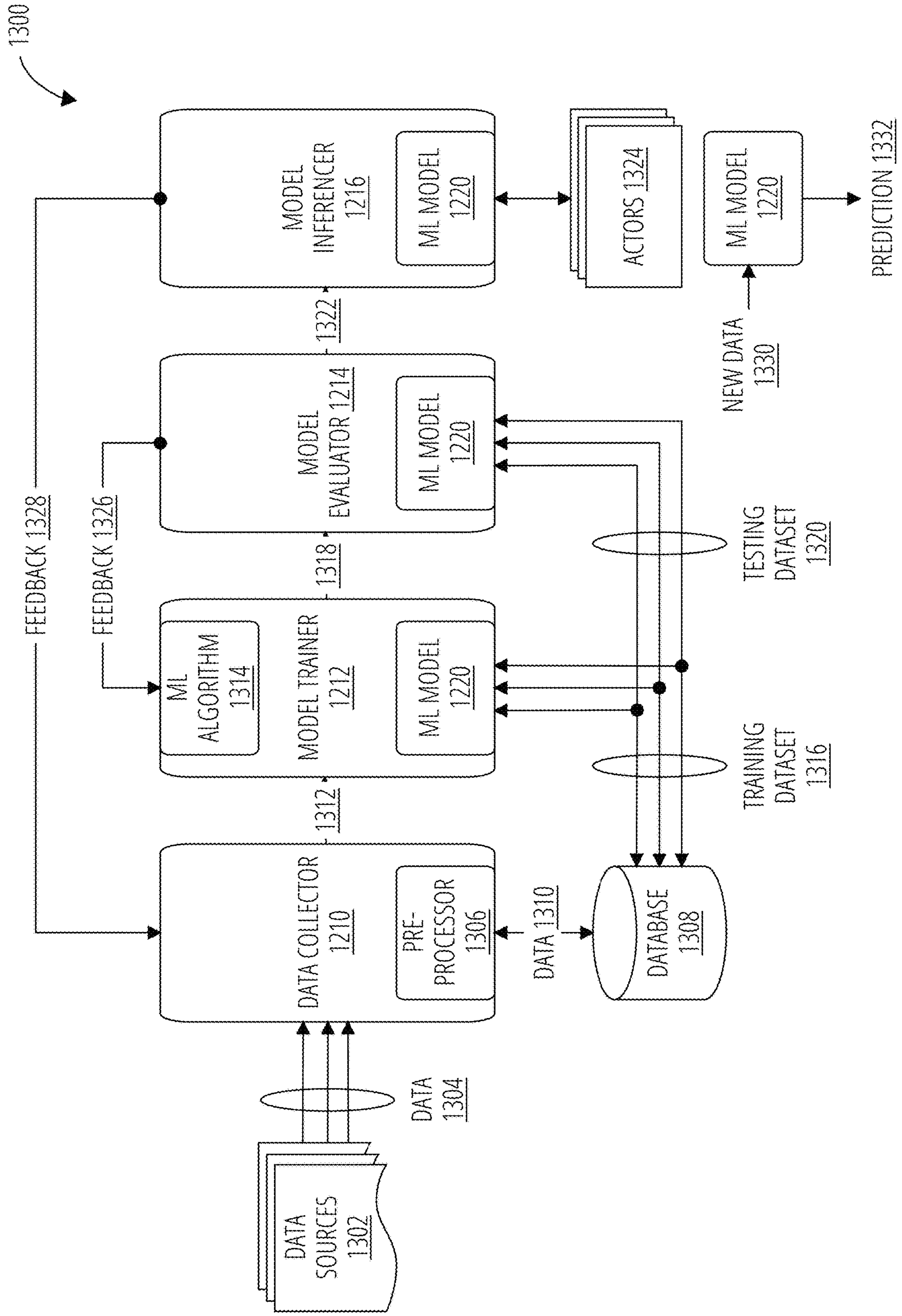
FIG. 13 illustrates a logic diagram in accordance with one embodiment.
Figure 14:
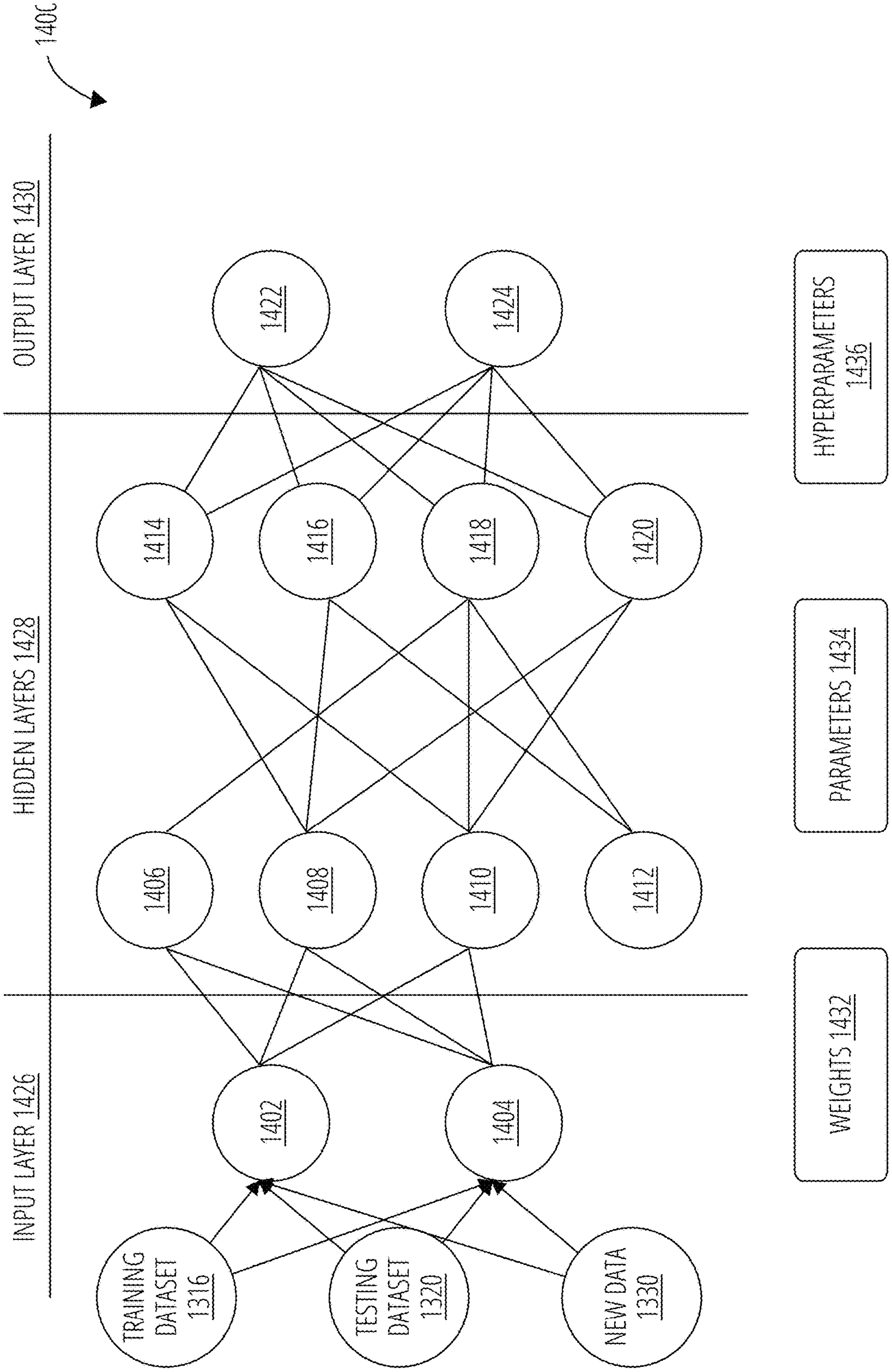
FIG. 14 illustrates an artificial neural network (ANN) in accordance with one embodiment.

The machine learning model 808 may include one or more machine learning models 808 as described herein. These machine learning models can be used to determine the probability metric 516 or the attribution value 518 for the set of user-probability pairs 514. FIG. 12 through FIG. 14 describes an example machine learning model 808 capable of performing the above functions.

Memory 504 further includes an objective function application 810 configured to execute the objective function 512 described herein. Moreover, the memory 504 includes a content item selection application 812 configured to execute content item selection based on the selected user identifier from the set of user-probability pairs 514, the profile attributes of the user profile associated with the user identifier, the available content items and the attribution value 518 assigned to the user identifier for the particular content item in question. The content item selection application 812 is further determined based on the outcome of the objective function. To help facilitate content item selection, the content item selection application 812 is configured to access content items 140 and receive the content by calling upon the receiving application 802.

Finally, the memory 504 stores and the processing circuit 502 executes a content delivery application 122 for sending the selected content to the third party server 154 for delivery to the entity on the browser or application on which the entity is accessing the third party server 154.

Figure 9:
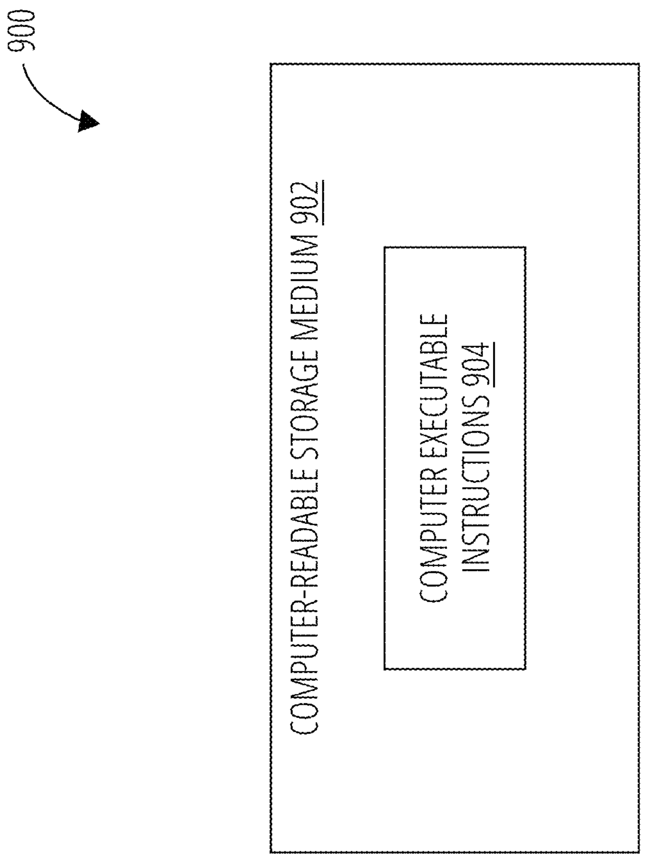
FIG. 9 illustrates a computer-readable storage medium in accordance with one embodiment.

FIG. 9 illustrates an apparatus 900. Apparatus 900 comprises any non-transitory computer-readable storage medium 902 or machine-readable storage medium, such as an optical, magnetic or semiconductor storage medium. In various embodiments, apparatus 900 comprises an article of manufacture or a product. In some embodiments, the computer-readable storage medium 902 stores computer executable instructions with which one or more processing devices or processing circuitry can execute. For example, computer executable instructions 904 includes instructions to implement operations described with respect to any method, operation, logic flows, timing diagram, or embodiment described herein. Examples of computer-readable storage medium 902 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 904 include any suitable type of code, such as source code, compiled code, interpreted code, executable code, static code, dynamic code, object-oriented code, visual code, and the like.

Figure 10:
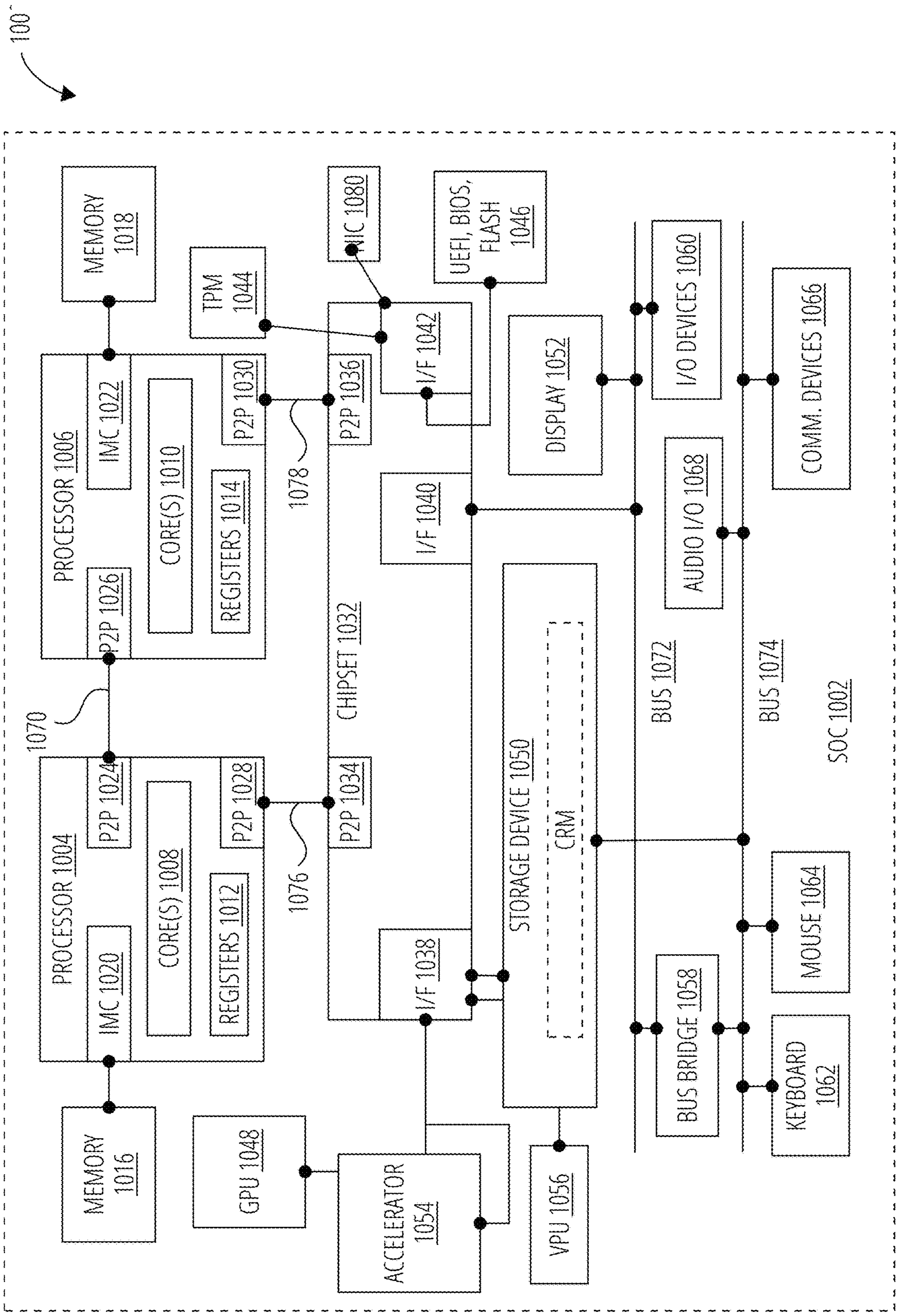
FIG. 10 illustrates a computing architecture in accordance with one embodiment.

FIG. 10 illustrates an embodiment of a computing architecture 1000. Computing architecture 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1000 has a single processor with one core or more than one processor. Note that the term "processor" refers to a processor with a single core or a processor package with multiple processor cores. In at least one embodiment, the computing architecture 1000 is representative of the components of the server device 102, the client device 104, the third party server 154 or any other computing device described herein. More generally, the computing architecture 1000 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1000. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 10, computing architecture 1000 comprises a system-on-chip (SoC) 1002 for mounting platform components. System-on-chip (SoC) 1002 is a point-to-point (P2P) interconnect platform that includes a first processor 1004 and a second processor 1006 coupled via a point-to-point interconnect 1070 such as an Ultra Path Interconnect (UPI). In other embodiments, the computing architecture 1000 is another bus architecture, such as a multi-drop bus. Furthermore, each of processor 1004 and processor 1006 are processor packages with multiple processor cores including core(s) 1008 and core(s) 1010, respectively. While the computing architecture 1000 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1004 and chipset 1032. Some platforms include additional components and some platforms include sockets to mount the processors and/or the chipset. Furthermore, some platforms do not have sockets (e.g. SoC, or the like). Although depicted as an SoC 1002, one or more of the components of the SoC 1002 are included in a single die package, a multi-chip module (MCM), a multi-die package, a chiplet, a bridge, and/or an interposer. Therefore, embodiments are not limited to an SoC.

The processor 1004 and processor 1006 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1004 and/or processor 1006. Additionally, the processor 1004 need not be identical to processor 1006.

Processor 1004 includes an integrated memory controller (IMC) 1020 and point-to-point (P2P) interface 1024 and P2P interface 1028. Similarly, the processor 1006 includes an IMC 1022 as well as P2P interface 1026 and P2P interface 1030. IMC 1020 and IMC 1022 couple the processor 1004 and processor 1006, respectively, to respective memories (e.g., memory 1016 and memory 1018). Memory 1016 and memory 1018 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1016 and the memory 1018 locally attach to the respective processors (i.e., processor 1004 and processor 1006). In other embodiments, the main memory couple with the processors via a bus and shared memory hub. Processor 1004 includes registers 1012 and processor 1006 includes registers 1014.

Computing architecture 1000 includes chipset 1032 coupled to processor 1004 and processor 1006. Furthermore, chipset 1032 are coupled to storage device 1050, for example, via an interface (I/F) 1038. The I/F 1038 may be, for example, a Peripheral Component Interconnect-enhanced (PCIe) interface, a Compute Express Link® (CXL) interface, or a Universal Chiplet Interconnect Express (UCIe) interface. Storage device 1050 stores instructions executable by circuitry of computing architecture 1000 (e.g., processor 1004, processor 1006, GPU 1048, accelerator 1054, vision processing unit 1056, or the like). For example, storage device 1050 can store instructions for the client device 104, the server device 102, data store 132, or the like.

Processor 1004 couples to the chipset 1032 via P2P interface 1028 and P2P 1034 while processor 1006 couples to the chipset 1032 via P2P interface 1030 and P2P 1036. Direct media interface (DMI) 1076 and DMI 1078 couple the P2P interface 1028 and the P2P 1034 and the P2P interface 1030 and P2P 1036, respectively. DMI 1076 and DMI 1078 is a high-speed interconnect that facilitates, e.g., eight Giga Transfers per second (GT/s) such as DMI 3.0. In other embodiments, the processor 1004 and processor 1006 interconnect via a bus.

The chipset 1032 comprises a controller hub such as a platform controller hub (PCH). The chipset 1032 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1032 comprises more than one controller hub such as a chipset with a memory controller hub, a graphics controller hub, and an input/output (I/O) controller hub.

In the depicted example, chipset 1032 couples with a trusted platform module (TPM) 1044 and UEFI, BIOS, FLASH circuitry 1046 via I/F 1042. The TPM 1044 is a dedicated microcontroller designed to secure hardware by integrating cryptographic keys into devices. The UEFI, BIOS, FLASH circuitry 1046 may provide pre-boot code. The I/F 1042 may also be coupled to a network interface circuit (NIC) 1080 for connections off-chip.

Furthermore, chipset 1032 includes the I/F 1038 to couple chipset 1032 with a high-performance graphics engine, such as, graphics processing circuitry or a graphics processing unit (GPU) 1048. In other embodiments, the computing architecture 1000 includes a flexible display interface (FDI) (not shown) between the processor 1004 and/or the processor 1006 and the chipset 1032. The FDI interconnects a graphics processor core in one or more of processor 1004 and/or processor 1006 with the chipset 1032.

The computing architecture 1000 is operable to communicate with wired and wireless devices or entities via the NIC 1080 using the IEEE 1102 family of standards, such as wireless devices operatively disposed in wireless communication (e.g., IEEE 1102.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 1102.11x (a, b, g, n, ac, ax, etc.) to provide secure, reliable, fast wireless connectivity. A Wi-Fi network is used to connect computers to each other, to the Internet, and to wired networks (which use IEEE 1102.3-related media and functions).

Additionally, accelerator 1054 and/or vision processing unit 1056 are coupled to chipset 1032 via I/F 1038. The accelerator 1054 is representative of any type of accelerator device (e.g., a data streaming accelerator, cryptographic accelerator, cryptographic co-processor, an offload engine, etc.). One example of an accelerator 1054 is the Intel® Data Streaming Accelerator (DSA). The accelerator 1054 is a device including circuitry to accelerate copy operations, data encryption, hash value computation, data comparison operations (including comparison of data in memory 1016 and/or memory 1018), and/or data compression. Examples for the accelerator 1054 include a USB device, PCI device, PCIe device, CXL device, UCIe device, and/or an SPI device. The accelerator 1054 also includes circuitry arranged to execute machine learning (ML) related operations (e.g., training, inference, etc.) for ML models. Generally, the accelerator 1054 is specially designed to perform computationally intensive operations, such as hash value computations, comparison operations, cryptographic operations, and/or compression operations, in a manner that is more efficient than when performed by the processor 1004 or processor 1006. Because the load of the computing architecture 1000 includes hash value computations, comparison operations, cryptographic operations, and/or compression operations, the accelerator 1054 greatly increases performance of the computing architecture 1000 for these operations.

The accelerator 1054 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1054. For example, the accelerator 1054 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1054 via a non-posted write (e.g., a deferred memory write (DMWr)). One example of an instruction that atomically submits a work descriptor to the shared work queue of the accelerator 1054 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1054. The dedicated work queue may accept job submissions via commands such as the movdir64b instruction.

Various I/O devices 1060 and display 1052 couple to the bus 1072, along with a bus bridge 1058 which couples the bus 1072 to a second bus 1074 and an I/F 1040 that connects the bus 1072 with the chipset 1032. In one embodiment, the second bus 1074 is a low pin count (LPC) bus. Various input/output (I/O) devices couple to the second bus 1074 including, for example, a keyboard 1062, a mouse 1064 and communication devices 1066.

Furthermore, an audio I/O 1068 couples to second bus 1074. Many of the I/O devices 1060 and communication devices 1066 reside on the system-on-chip (SoC) 1002 while the keyboard 1062 and the mouse 1064 are add-on peripherals. In other embodiments, some or all the I/O devices 1060 and communication devices 1066 are add-on peripherals and do not reside on the system-on-chip (SoC) 1002.

Figure 11:
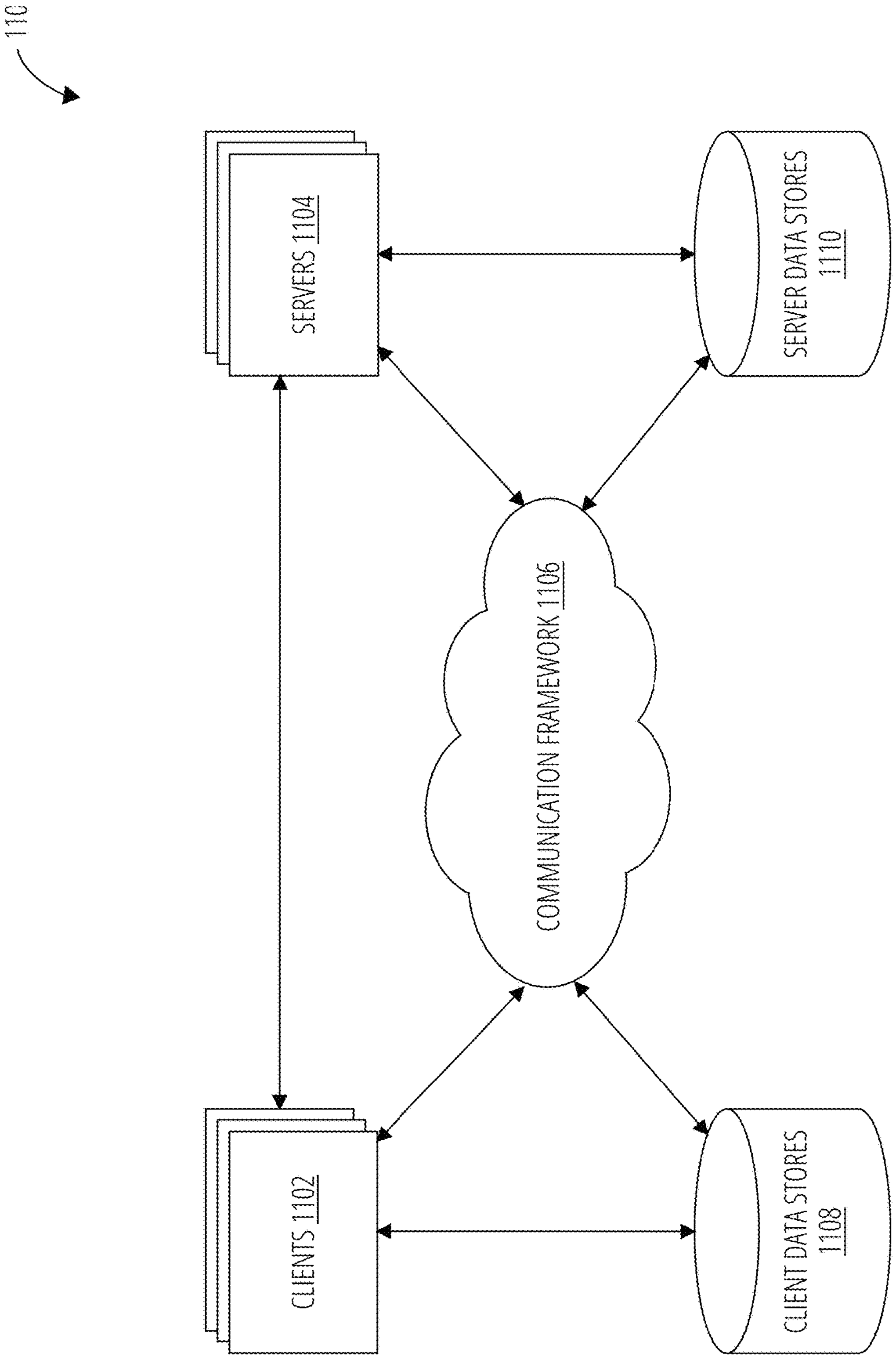
FIG. 11 illustrates a communications architecture in accordance with one embodiment.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 communicate information between each other using a communication framework 1106. The communication framework 1106 implements any well-known communications techniques and protocols. The communication framework 1106 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1106 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/200/1000 Base T, and the like), token ring, wireless network interfaces, cellular network interfaces, IEEE 1102.11 network interfaces, IEEE 1102.16 network interfaces, IEEE 1102.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1102 and the servers 1104. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

FIG. 12 illustrates an apparatus 1200. The apparatus 1200 depicts a training device 1202 suitable for training an ML model 1220 for the connection network platform 112. For example, ML model 1220 can be used to perform operations for machine learning model(s) 508 described herein. Specifically, the training device 1202 trains the ML model 1220 to perform inferencing operations in support of the server device 102, determining the probability metrics 516, and determining the attribution values 518 described above.

As depicted in FIG. 12, the training device 1202 includes a processing circuitry 1204 and a memory unit 1206. The memory unit 1206 may store a set of ML components 1208 to support various AI/ML techniques. The ML components 1208 comprise a data collector 1210, a model trainer 1212, a model evaluator 1214 and a model inferencer 1216.

In general, the data collector 1210 collects data 1218 from one or more data sources to use as training data for an ML model 1220. For example, the data collected may include profile attributes from the entity data 134, content items 140, and historical content item selections 520. The data collector 1210 collects different types of data 1218, such as text information, audio information, image information, video information, graphic information, and so forth. The model trainer 1212 receives as input the collected data and uses a portion of the collected data as test data for an AI/ML algorithm to train the ML model 1220. The model evaluator 1214 evaluates and improves the trained ML model 1220 using a portion of the collected data as test data to test the ML model 1220. The model evaluator 1214 also uses feedback information from the deployed ML model 1220. The model inferencer 1216 implements the trained ML model 1220 to receive as input new unseen data, generate one or more inferences on the new data, and output a result such as a probability that a user identifier is associated with an entity 108 accessing the third party server 154, a selection of a content item to deliver to the third party server 154, an alert, a recommendation or other post-solution activity. An exemplary AI/ML architecture for the ML components 1208 is described in more detail with reference to FIG. 13.

In some embodiments, the ML model 1220 can be trained and designed to execute one or more statistical algorithms or methods described herein. For example, the ML model 1220 can be configured or trained to execute one or more of logistic regression models, Bayesian networks, Hidden Markov Models (HMM), or Expectation-Maximization (EM) algorithms. In addition, further examples of the ML model 1220 can be trained to determine the attribution value 518, including attribution values for each individual content item and each user identifier in the set of user-probability pairs 514.

FIG. 13 illustrates a logic diagram 1300 suitable for use by the training device 1202 to generate the ML model 1220 for deployment by the server device 102. The logic diagram 1300 is an example of a system suitable for implementing various AI techniques and/or ML techniques to perform various training tasks on behalf of the various devices of the server device 102.

In one embodiment, the training device 1202 trains an ML model 1220. In the context of machine learning, "training" refers to the process of teaching a model to recognize patterns and make predictions based on data. This involves initializing the model with initial parameters, which are often set randomly. The model is then provided with a dataset that includes input features and the corresponding correct outputs, often referred to as labels or targets. As the model processes this data, it generates predictions based on its current parameters. The difference between these predictions and the actual target values is measured using a loss function, which quantifies the model's accuracy. The goal is to minimize this loss. To achieve this, the model's parameters are adjusted using optimization techniques such as gradient descent. By continuously refining these parameters, the model gradually improves its predictions. This cycle of making predictions, calculating the loss, and updating parameters is repeated many times, allowing the model to learn and improve over time. The ultimate aim of training is to produce a model that performs well not just on the training data but also on new, unseen data. This ensures the model's ability to generalize, making it effective in real-world applications.

In various embodiments, the training device 1202 may pretrain an ML model 1220 before training the ML model 1220 or trains a pretrained ML model 1220. In the context of machine learning, "pretraining" refers to the initial phase of training a model on a large, general dataset before fine-tuning it on a more specific task or dataset. This approach is particularly common in deep learning, especially with models like neural networks that can benefit from learning basic patterns and representations from broad data before being specialized for a particular application. During pretraining, the model is exposed to a diverse set of data, allowing it to learn fundamental features or representations that are useful across various tasks. For example, in natural language processing, a model might be pretrained on a large corpus of text to understand language structure and grammar. Once the model has acquired this general knowledge, it can be fine-tuned on a smaller, task-specific dataset, such as sentiment analysis or translation. Pretraining is beneficial because it allows the model to start with a good foundation of knowledge, which can lead to better performance and faster convergence during the fine-tuning phase. It also helps when there is limited labeled data for the specific task, as the pretrained model already has a strong understanding from the broader data.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the logic diagram 1300 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 1220, evaluate performance of the trained ML model 1220, and deploy the tested ML model 1220 as the trained ML model 1220 in a production environment, and continuously monitor and maintain it.

The ML model 1220 is a mathematical construct used to predict outcomes based on a set of input data. The ML model 1220 is trained using large volumes of training dataset 1316, and it can recognize patterns and trends in the training dataset 1316 to make accurate predictions. The ML model 1220 is derived from an ML algorithm 1314. A data set (e.g., profile attributes from the entity data 134, as described above and historical content item selections 520) is fed into the ML algorithm 1314 which trains an ML model 1220 to "learn" a function that produces mappings between a set of inputs and a set of outputs with a reasonably high accuracy. Given a sufficiently large enough set of inputs and outputs, the ML algorithm 1314 finds the function for a given task. This function may even be able to produce the correct output for input that it has not seen during training. A data scientist prepares the mappings, selects and tunes the ML algorithm 1314, and evaluates the resulting model performance. Once the ML model 1220 is sufficiently accurate on test data, it can be deployed for production use.

The ML algorithm 1314 is generally a computational procedure used to identify patterns within data and make inferences or predictions without being explicitly programmed for every scenario. The ML algorithm 1314 can process input data, learn from it by adjusting internal parameters, and then apply the learned information to new, unseen data. The ML algorithm 1314 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 1314 of the logic diagram 1300 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naïve Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 13, the logic diagram 1300 includes a set of data sources 1302 to source data 1304 for the training device 1202. Data sources 1302 may comprise any device capable generating, processing, storing or managing data 1304 suitable for a ML system. Examples of data sources 1302 include without limitation databases (e.g., entity data 134 and databases containing historical content item selections), web scraping, sensors and Internet of Things (IoT) devices, image and video cameras, audio devices, text generators, publicly available databases, private databases, and many other data sources 1302. The data sources 1302 may be remote from the training device 1202 and accessed via a network, local to the training device 1202 and accessed via a network interface, or may be a combination of local and remote data sources 1302.

The data sources 1302 source different types of data 1304. By way of example and not limitation, the data 1304 includes structured data from relational databases, such as customer profiles, transaction histories, or product inventories. The data 1304 includes unstructured data from websites such as customer reviews, news articles, social media posts, or product specifications. The data 1304 includes data from temperature sensors, motion detectors, and smart home appliances. The data 1304 includes image data from medical images, security footage, or satellite images. The data 1304 includes audio data from speech recognition, music recognition, or call centers. The data 1304 includes text data from emails, chat logs, customer feedback, news articles or social media posts. The data 1304 includes publicly available datasets such as those from government agencies, academic institutions, or research organizations. These are just a few examples of the many sources of data that can be used for ML systems. It is important to note that the quality and quantity of the data is critical for the success of a machine learning project.

The data 1304 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 1302 are communicatively coupled to a data collector 1210. The data collector 1210 gathers relevant data 1304 from the data sources 1302. Once collected, the data collector 1210 may use a pre-processor 1306 to make the data 1304 suitable for analysis. This involves data cleaning, transformation, and feature engineering. Data preprocessing is a critical step in ML as it directly impacts the accuracy and effectiveness of the ML model 1220. The pre-processor 1306 receives the data 1304 as input, processes the data 1304, and outputs pre-processed data 1310 for storage in a database 1308. Examples for the database 1308 includes a hard drive, solid state storage, and/or random access memory (RAM).

The data collector 1210 is communicatively coupled to a model trainer 1212. The model trainer 1212 performs AI/ML model training, validation, and testing which may generate model performance metrics as part of the model testing procedure. The model trainer 1212 receives the pre-processed data 1310 as input 1312 or via the database 1308. The model trainer 1212 implements a suitable ML algorithm 1314 to train an ML model 230 on a set of training dataset 1316 from the pre-processed data 1310. The training process involves feeding the pre-processed data 1310 into the ML algorithm 1314 to produce or optimize an ML model 1220. The training process adjusts its parameters until it achieves an initial level of satisfactory performance.

The model trainer 1212 is communicatively coupled to a model evaluator 1214. After an ML model 1220 is trained, the ML model 1220 needs to be evaluated to assess its performance. This is done using various metrics such as accuracy, precision, recall, and F1 score. The model trainer 1212 outputs the ML model 1220, which is received as input 1312 or from the database 1308. The model evaluator 1214 receives the ML model 230 as input 1318, and it initiates an evaluation process to measure performance of the ML model 1220. The evaluation process includes providing feedback 1326 to the model trainer 1212. The model trainer 1212 re-trains the ML model 1220 to improve performance in an iterative manner.

The model evaluator 1214 is communicatively coupled to a model inferencer 1216. The model inferencer 1216 provides AI/ML model inference output (e.g., inferences, predictions or decisions). Once the ML model 1220 is trained and evaluated, it is deployed in a production environment where it is used to make predictions on new data. The model inferencer 1216 receives the evaluated ML model 1220 as input 1322. The model inferencer 1216 uses the evaluated ML model 1220 to produce insights or predictions on real data, which is deployed as a final production ML model 1220. The inference output of the ML model 1220 is use case specific. The model inferencer 1216 also performs model monitoring and maintenance, which involves continuously monitoring performance of the ML model 1220 in the production environment and making any necessary updates or modifications to maintain its accuracy and effectiveness. The model inferencer 1216 provides feedback 1326 to the data collector 1210 to train or re-train the ML model 1220. The feedback 1326 includes model performance feedback information, which is used for monitoring and improving performance of the ML model 1220.

Some or all of the model inferencer 1216 is implemented by various actors 1324 in the logic diagram 1300, including the ML model 1220 of the connection network platform 112, for example. The actors 1324 use the deployed ML model 1220 on new data to make inferences or predictions for a given task, and output a prediction 1332. The actors 1324 implement the model inferencer 1216 locally, or remotely receives outputs from the model inferencer 1216 in a distributed computing manner. The actors 1324 trigger actions directed to other entities or to itself. The actors 1324 provide feedback 1328 to the data collector 1210 via the model inferencer 1216. The feedback 1328 comprise data needed to derive training data, inference data or to monitor the performance of the ML model 1220 and its impact to the network through updating of key performance indicators (KPIs) and performance counters.

As previously described with reference to FIGS. 2, 3A-3C, and 4A-4C, the connection network platform 112, server device 102, and/or the apparatus 1200 may implement some or all of the logic diagram 1300 to support various use cases and solutions for various AI/ML tasks. In various embodiments, the training device 1202 of the apparatus 1200 uses the logic diagram 1300 to generate and train the ML model machine learning model(s) 508 for use by the server device 102 to generate the user-probability pairs 514, including the probability metric 516 and the attribution value 518. The logic diagram 1300 can further be used to select a content item for delivery to the third party server 154. In one embodiment, for example, the training device 1202 may train the ML model 1220 as a neural network, as described in more detail with reference to FIG. 14. Other use cases and solutions for AI/ML are possible as well, and embodiments are not limited in this context.

FIG. 14 illustrates an embodiment of an artificial neural network 1400. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another. The artificial neural network 1400 can be used to develop the machine learning model(s) 508 and ML model 1220 described herein.

Artificial neural network 1400 comprises multiple node layers, containing an input layer 1426, one or more hidden layers 1428, and an output layer 1430. Each layer comprises one or more nodes, such as nodes 1402 to 1424. As depicted in FIG. 14, for example, the input layer 1426 has nodes 1402, 1404. The artificial neural network 1400 has two hidden layers 1428, with a first hidden layer having nodes 1406, 1408, 1410 and 1412, and a second hidden layer having nodes 1414, 1416, 1418 and 1420. The artificial neural network 1400 has an output layer 1430 with nodes 1422, 1424. Each node 1402 to 1424 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 1400 relies on training dataset 1316 to learn and improve accuracy over time. However, once the artificial neural network 1400 is fine-tuned for accuracy, and tested on testing dataset 1320, the artificial neural network 1400 is ready to classify and cluster new data 1330 at a high velocity. Tasks in speech recognition or image recognition can take minutes versus hours when compared to the manual identification by human experts.

Each individual node 1402 to 1424 is a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \qquad \text{EQUATION (1)}$$

$$\text{output} = f(x) = 1 \text{ if } \sum w1x1 + b >= 0;\ 0 \text{ if } \sum w1x1 + b < 0$$

Once an input layer 1426 is determined, a set of weights 1432 are assigned. The weights 1432 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 1400 as a feedforward network.

In one embodiment, the artificial neural network 1400 leverages sigmoid neurons, which are distinguished by having values between 0 and 1. Since the artificial neural network 1400 behaves similarly to a decision tree, cascading data from one node to another, having x values between 0 and 1 will reduce the impact of any given change of a single variable on the output of any given node, and subsequently, the output of the artificial neural network 1400.

The artificial neural network 1400 has many practical use cases, like image recognition, speech recognition, text recognition or classification. The artificial neural network 1400 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \quad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 1434 of the model adjust to gradually converge at the minimum.

In one embodiment, the artificial neural network 1400 is feedforward, meaning it flows in one direction only, from input to output. In one embodiment, the artificial neural network 1400 uses backpropagation. Backpropagation is when the artificial neural network 1400 moves in the opposite direction from output to input. Backpropagation allows calculation and attribution of errors associated with each neuron 1402 to 1424, thereby allowing adjustment to fit the parameters 1434 of the machine learning model(s) 508 appropriately.

The artificial neural network 1400 is implemented as different neural networks depending on a given task. Neural networks are classified into different types, which are used for different purposes. In one embodiment, the artificial neural network 1400 is implemented as a feedforward neural network, or multi-layer perceptrons (MLPs), comprised of an input layer 1426, hidden layers 1428, and an output layer 1430. While these neural networks are also commonly referred to as MLPs, they are actually comprised of sigmoid neurons, not perceptrons, as most real-world problems are nonlinear. Trained data 1304 usually is fed into these models to train them, and they are the foundation for computer vision, natural language processing, and other neural networks. In one embodiment, the artificial neural network 1400 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1400 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1400 is implemented as any type of neural network suitable for a given operational task of server device 102, and the MLP, CNN, and RNN are merely a few examples. Embodiments are not limited in this context.

The artificial neural network 1400 includes a set of associated parameters 1434. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1400 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 1436. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on entity data without user authorization. In instances where entity data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding entity data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

What is claimed is:

1. A method comprising:

receiving, by a content delivery server, a request from a web server for content;

determining, by the content delivery server, a set of user-probability pairs, wherein each of the user-probability pairs includes a predicted user identifier and a probability that the predicted user identifier is associated with the request from the web server, and wherein each pair in the set of user-probability pairs includes an attribution value associated therewith;

applying, by the content delivery server, an objective function to the set of user-probability pairs to select one user identifier of the set of user identifiers with a corresponding candidate user profile, wherein applying the objective function comprises:

in a first selection, selecting, by the content delivery server, a random user identifier; or in a second selection, selecting, by the content delivery server, the user identifier having a greatest attribution value associated therewith;

wherein the content delivery server is configured to make a decision to execute the first selection or the second selection based on a selection parameter;

accessing, by the content delivery server, the corresponding candidate user profile of the selected user identifier to determine a set of attributes of the corresponding candidate user profile;

selecting, by the content delivery server and based on the request and the set of attributes, a content item from a plurality of content item options to be sent to the web server; and causing, by the content delivery server, the content item to be sent to the web server.

2. The method of claim 1, wherein the request includes third-party data associated with an entity accessing the web server via a web browser without specifying an identity of the entity.

3. The method of claim 2, wherein the third-party data includes:

an Internet protocol (IP) address used by a computing device executing the web browser;

location information about the entity; or device information of a computing device executing the web browser.

4. The method of claim 2, wherein determining the probability that the predicted user identifier is associated with the request includes using a probabilistic identity graph to analyze the third-party data and generate the probability.

5. The method of claim 1, wherein the selection parameter is determined based on an outcome of an online A/B testing execution.

6. The method of claim 1, wherein the request is associated with an entity accessing the web server; and wherein the attribution value represents a value associated with the predicted user identifier that implies how relevant one or more items of content are to the entity.

7. The method of claim 1, wherein the request includes parameters regarding a type of content being requested; and wherein selecting the content item based on the request includes selecting the content item that corresponds to the parameters of the content being requested.

8. A computing device comprising:

a processing circuit; and a memory having executable instructions stored thereon, which when executed by the processing circuit cause the processing circuit to:

receive a request from a web server for content;

determine, based on the request, a set of user-probability pairs, wherein each of the user-probability pairs includes a predicted user identifier and a probability that the predicted user identifier is associated with the request from the web server, and wherein each pair in the set of user-probability pairs includes an attribution value associated therewith;

apply an objective function to the set of user-probability pairs to select one of the user identifiers with a corresponding candidate user profile, wherein applying the objective function includes the processing circuit being caused to:

in a first selection, select a random user identifier and candidate user profile; or in a second selection, select the user identifier and candidate user profile having a greatest attribution value associated therewith;

wherein the processing circuit is further caused to make a decision to execute the first selection or the second selection based on a selection parameter;

access the candidate user profile of the selected user identifier to determine a set of attributes of the candidate user profile;

select, based on the request and the set of attributes of the candidate user profile of the selected user identifier, a content item from a plurality of content item options to be sent to the web server; and send the content item to the web server.

9. The computing device of claim 8, wherein the request includes third-party data associated with an entity accessing the web server via a web browser without specifying an identity of the entity.

10. The computing device of claim 9, wherein the third-party data includes:

an Internet Protocol (IP) address used by a computing device executing the web browser;

location information about the entity; or device information of a computing device executing the web browser.

11. The computing device of claim 9, wherein determining the probability that the predicted user identifier is associated with the request includes the processing circuit being configured to use a probabilistic identity graph to analyze the third-party data and generate the probability.

12. The computing device of claim 8, wherein the selection parameter is determined based on an outcome of an online A/B testing execution.

13. The computing device of claim 8, wherein the request is associated with an entity accessing the web server; and wherein the attribution value represents a value associated with the predicted user identifier that implies how relevant one or more items of content are to the entity.

14. The computing device of claim 8, wherein the request includes parameters regarding a type of content being requested; and wherein selecting the content item based on the request includes the processing circuit being caused to select the content item that corresponds to the parameters of the content being requested.

15. A non-transitory computer-readable storage medium having executable instructions stored thereon, which when executed by a processing circuit of a computing device cause the computing device to:

receive a request from a web server for content;

determine, based on the request, a set of user-probability pairs, wherein each of the user-probability pairs includes a predicted user identifier and a probability that the predicted user identifier is associated with the request from the web server, and wherein each pair in the set of user-probability pairs includes an attribution value associated therewith;

apply an objective function to the set of user-probability pairs to select one of the user identifiers with a corresponding candidate user profile, wherein applying the objective function includes the computing device being caused to:

in a first selection, select a random user identifier and candidate user profile; or in a second selection, select the user identifier and candidate user profile having a greatest attribution value associated therewith;

wherein the computing device is further caused to make a decision to execute the first selection or the second selection based on a selection parameter;

access the candidate user profile of the selected user identifier to determine a set of attributes of the candidate user profile;

select, based on the request and the set of attributes of the candidate user profile of the selected user identifier, a content item from a plurality of content item options to be sent to the web server; and send the content item to the web server.

16. The non-transitory computer-readable storage medium of claim 15, wherein the selection parameter is determined based on an outcome of an online A/B testing execution.

* * * * *